(12) United States Patent
Pandit et al.

(10) Patent No.: US 8,311,121 B2
(45) Date of Patent: Nov. 13, 2012

(54) METHODS AND APPARATUS FOR WEIGHTED PREDICTION IN SCALABLE VIDEO ENCODING AND DECODING

(75) Inventors: Purvin Bibhas Pandit, Franklin Park, NJ (US); Jill MacDonald Boyce, Manalapan, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1273 days.

(21) Appl. No.: 11/992,452

(22) PCT Filed: Oct. 10, 2006

(86) PCT No.: PCT/US2006/039556
§ 371 (c)(1),
(2), (4) Date: Mar. 20, 2008

(87) PCT Pub. No.: WO2007/047271
PCT Pub. Date: Apr. 26, 2007

(65) Prior Publication Data
US 2010/0158110 A1 Jun. 24, 2010

Related U.S. Application Data

(60) Provisional application No. 60/725,687, filed on Oct. 12, 2005.

(51) Int. Cl.
*H04B 1/66* (2006.01)
*H04N 1/12* (2006.01)
*H04N 11/02* (2006.01)
*H04N 11/04* (2006.01)
(52) U.S. Cl. .................................. 375/240.24; 375/240
(58) Field of Classification Search .................. 375/240, 375/240.02, E7.016, E7.015, E7.137, 265, 375/240.01, 240.08, 240.09, 240.1, 240.11, 375/240.12–240.16, 240.24
See application file for complete search history.

(56) References Cited

FOREIGN PATENT DOCUMENTS
EP 1737243 12/2006

OTHER PUBLICATIONS

Boyce, J.M., "Weighted Prediction in the H.264/MPEG AVC Video Coding Standard," Thomson, Corporate Research Princeton, NJ, 0-7803-8251-X/04, 2004 IEEE, jill.boyce@thomson.net.
Yin et al., "Weighted Prediction in SVC," Document: JVT-P064, Joint Video Team (JVT) of ISO/IEC MPEG & ITU-T VCEG, 16th Meeting, Poznan, Poland, Jul. 25-29, 2005, XP-002399866.
Reichel et al., "Joint Scalable Video Model JSVM-3," JV-P202, Joint Video Team (JVT) of ISO/IEC MPEG & ITU-T VCEG, 16th Meeting: Poznan, Poland, Jul. 2005, XP-002384686.

(Continued)

*Primary Examiner* — Kwang B Yao
*Assistant Examiner* — Adam Duda
(74) *Attorney, Agent, or Firm* — Robert D. Shedd; Paul P. Kiel; Guy H. Eriksen

(57) ABSTRACT

There are provided methods and apparatus for weighted prediction in scalable video encoding and decoding. A scalable video encoder includes an encoder (100) for encoding a block in an enhancement layer of a picture by applying a weighting parameter to an enhancement layer reference picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

37 Claims, 12 Drawing Sheets

OTHER PUBLICATIONS

Yin et al., "Localized Weighted Prediction for Video Coding," 0-7803-8834, 2005 IEEE, peng.yin@thomson.net, aiexismt@ieee.org, jill.boyce@thomson.net, XP-010816640.

Lee, "Extension of Weighted Prediction to Multi Layer Structure," JVT-P076, Joint Video Team (JVT) of ISO/IEC MPEG & ITU-T VCEG, 16th Meeting: Poznan, Poland, Jul. 25-29, 2005, XP-002399725.

METHODS AND APPARATUS FOR WEIGHTED PREDICTION IN SCALABLE VIDEO ENCODING AND DECODING

CROSS-REFERENCE TO RELATED APPLICATIONS

This application claims the benefit, under 35 U.S.C. §365 of International Application PCT/US2006/039556, filed Oct. 10, 2006 which was published in accordance with PCT Article 21(2) on Apr. 26, 2007 in English and which claims the benefit of U.S. provisional patent application No. 60/725,687 filed Oct. 12, 2005.

FIELD OF THE INVENTION

The present invention relates generally to video encoding and decoding and, more particularly, to methods and apparatus for weighted prediction in scalable video encoding and decoding.

BACKGROUND OF THE INVENTION

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard") is the first international video coding standard to include a Weighted Prediction (WP) tool. The scalable video coding (SVC) standard, which is currently being developed as an amendment of the H.264 standard (and is thus also interchangeably referred to herein as the "H.264 standard"), also adopts weighted prediction. However, the H.264 standard does not specify the relationship of weights among the base layer and enhancement layer.

Weighted Prediction is supported in the Main, Extended, and High profiles of the H.264 standard. The use of WP is indicated in the sequence parameter set for P and SP slices using the weighted_pred_flag field, and for B slices using the weighting_bipred_idc field. There are two WP modes, an explicit mode and an implicit mode. The explicit mode is supported in P, SP, and B slices. The implicit mode is supported in only B slices.

weighted_pred_flag equal to 0 specifies that weighted prediction shall not be applied to P and SP slices. weighted_pred_flag equal to 1 specifies that weighted prediction shall be applied to P and SP slices.

weighted_bipred_idc equal to 0 specifies that the default weighted prediction shall be applied to B slices. weighted_bipred_idc equal to 1 specifies that explicit weighted prediction shall be applied to B slices. weighted_bipred_idc equal to 2 specifies that implicit weighted prediction shall be applied to B slices. The value of weighted_bipred_idc shall be in the range of 0 to 2, inclusive.

A single weighting factor and offset are associated with each reference index for each color component in each slice. In explicit mode, these WP parameters may be coded in the slice header. In implicit mode, these WP parameters are derived based only on the relative distance of the current picture and its reference pictures.

For each macroblock or macroblock partition, the weighting parameters applied are based on a reference picture index (or indices in the case of bi-prediction) of the current macroblock or macroblock partition. The reference picture indices are either coded in the bitstream or may be derived, e.g., for skipped or direct mode macroblocks. The use of the reference picture index to signal which weighting parameters to apply is bitrate efficient, as compared to requiring a weighting parameter index in the bitstream, since the reference picture index is already available based on the other required bitstream fields.

Many different methods of scalability have been widely studied and standardized, including SNR scalability, spatial scalability, temporal scalability, and fine grain scalability, in scalability profiles of the MPEG-2 and H.264 standards, or are currently being developed as an amendment of the H.264 standard.

For spatial, temporal and SNR scalability, a large degree of inter-layer prediction is incorporated. Intra and inter macroblocks can be predicted using the corresponding signals of previous layers. Moreover, the motion description of each layer can be used for a prediction of the motion description for following enhancement layers. These techniques fall into three categories: inter-layer intra texture prediction, inter-layer motion prediction and inter-layer residue prediction (via residual_prediction_flag).

In the Joint Scalable Video Model (JSVM), which is currently being developed as extension/amendment to the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard"), an enhancement layer macroblock can exploit inter-layer motion prediction using scaled base layer motion data, using either "BASE_LAYER_MODE" or "QPEL_REFINEMENT_MODE", as in case of dyadic (two-layer) spatial scalability. In addition, in macroblock (or sub-macroblock) prediction mode, the predictor of a motion vector can choose from a base layer motion vector or an enhancement layer motion vector from a spatial neighbor, via motion_prediction_flag_lx[ ]. motion_prediction_flag_lx[ ] equal to 1 specifies that the (scaled) base layer motion vector are used as motion vector predictors. motion_prediction_flag_lx[ ] equal to 0 specifies that enhancement layer motion vector from spatial neighbors are used as motion vector predictors.

In first and second prior art approaches relating to weighted prediction for scalable video coding, it was proposed to always inherit the base layer weights for the enhancement layer. This is efficient since the weights in the enhancement layer do not have to be transmitted when the same algorithm is used to calculate the weighing parameters in the base and enhancement layer. This inheritance is indicated in the first prior art approach by adding a flag (base_pred_weight_table_flag) to the slice header, and in the second prior art approach by the syntax and semantic changes of the weighted_pred_flag, weighted_bipred_idc, motion_prediction_flag_lx[ ] and residue_prediction_flag. In the first prior art approach, when base_pred_weight_table_flag is equal to 1, the enhancement layer always inherits the base layer weights. The H.264 standard does not specify which set of weights should be used for the enhancement layer when inter-layer prediction modes (mentioned above) are used and base_pred_weight_table_flag is 0.

SUMMARY OF THE INVENTION

These and other drawbacks and disadvantages of the prior art are addressed by the present invention, which is directed to methods and apparatus for weighted prediction in scalable video encoding and decoding.

According to an aspect of the present invention, there is provided a scalable video encoder. The scalable video encoder includes an encoder for encoding a block in an enhancement layer of a picture by applying a weighting parameter to an enhancement layer reference picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

According to another aspect of the present invention, there is provided a method for scalable video encoding. The method includes encoding a block in an enhancement layer of a picture by applying a weighting parameter to an enhancement layer reference picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

According to yet another aspect of the present invention, there is provided a scalable video decoder. The scalable video decoder includes a decoder for decoding a block in an enhancement layer of a picture by applying a weighting parameter to an enhancement layer reference picture. The weighting parameter used to decode the block in the enhancement layer is adaptively determined from between a weighting parameter applied to a lower layer reference picture to decode a block in the lower layer of the picture and a different weighting parameter applicable in the enhancement layer. The block in the enhancement layer corresponds to the block in the lower layer. The enhancement layer reference picture corresponds to the lower layer reference picture.

According to an additional aspect of the present invention, there is provided a method for scalable video decoding. The method includes decoding a block in an enhancement layer of a picture by applying a weighting parameter to an enhancement layer reference picture. The weighting parameter used to decode the block in the enhancement layer is adaptively determined from between a weighting parameter applied to a lower layer reference picture to decode a block in the lower layer of the picture and a different weighting parameter applicable in the enhancement layer. The block in the enhancement layer corresponds to the block in the lower layer. The enhancement layer reference picture corresponds to the lower layer reference picture.

According to a further aspect of the present invention, there is provided a video signal structure for scalable video encoding. The video signal structure includes a block encoded in an enhancement layer of a picture generated by applying a weighting parameter to an enhancement layer reference-picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

According to a further additional aspect of the present invention, there is provided a storage media having scalable video signal data encoded thereupon. The scalable video signal data includes a block encoded in an enhancement layer of a picture generated by applying a weighting parameter to an enhancement layer reference picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
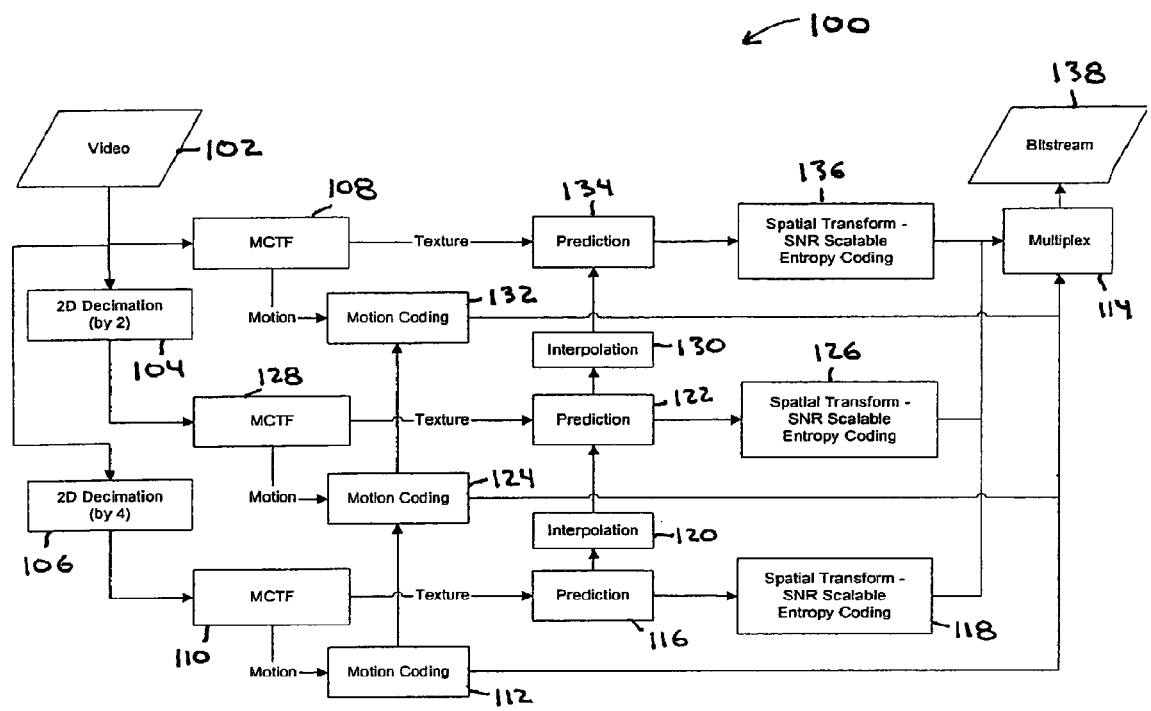
FIG. 1 shows a block diagram for an exemplary Joint Scalable Video Model (JSVM) encoder to which the present principles may be applied.

The present invention is directed to methods and apparatus for weighted prediction in scalable video encoding and decoding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary Joint Scalable Video Model (hereinafter "JSVM") encoder to which the present invention may be applied is indicated generally by the reference numeral 100. The JSVM encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in signal communication with a first input of a prediction module 134. An output of the prediction module 134 is connected in signal communication with a spatial transformer 136. An output of the spatial transformer is connected in signal communication with the second input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy. The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
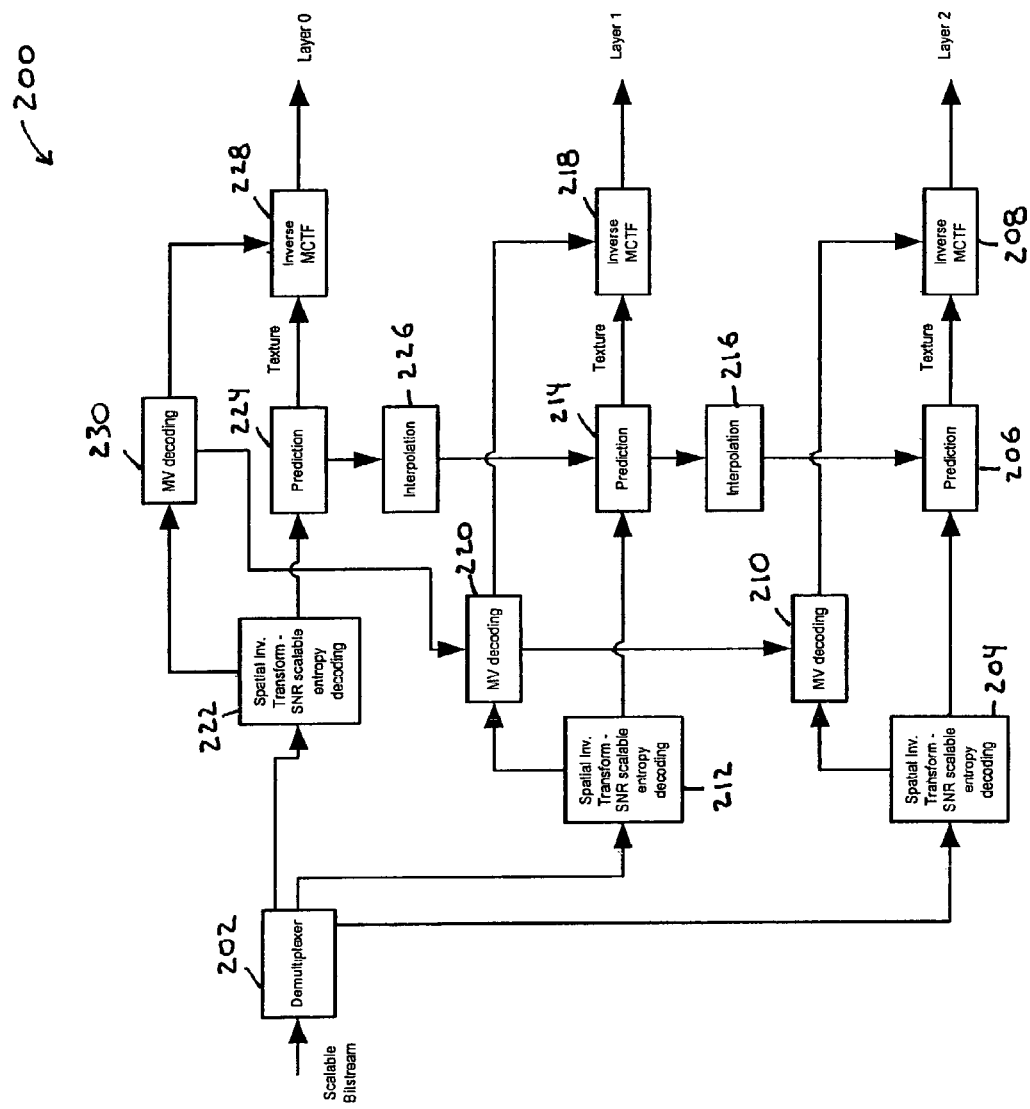
FIG. 2 shows a block diagram for an exemplary decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected in signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

In accordance with embodiments of the present principles, weighting parameters for enhancement layer weighted prediction are selected from among the base layer weights and the enhancement layer weights. This can result in improving coding performance especially for localized intensity changes. In various embodiments of the present principles, the selection is performed adaptively and/or the selection is dependent upon the macroblock mode. Various exemplary embodiments are also illustrated for the selection of modes at the encoder.

If the encoder chooses to use a different algorithm for base and enhancement layer or if the base layer does not choose to use weighted prediction but the enhancement layer uses weighted prediction, the weighting parameters are explicitly transmitted in the enhancement layer.

In JSVM, an enhancement layer macroblock can exploit inter-layer prediction using scaled base layer motion data, using either "BASE_LAYER_MODE" or "QPEL_REFINEMENT_MODE", as in case of dyadic (two-layer) spatial scalability. In addition, in macroblock (or sub-macroblock) prediction mode, the motion vector predictor can choose between a base layer motion vector or an enhancement layer motion vector predictor from a spatial neighbor, via motion_prediction_flag_lx[ ]. motion_prediction_flag_lx[ ] equal to 1 specifies that the (scaled) base layer motion vectors are used as motion vector predictors. motion_prediction_flag_lx[ ] equal to 0 specifies that enhancement layer motion vectors from spatial neighbors are used as motion vector predictors.

When base_mode_flag is equal to 1, or base_mode_refinemend_flag is equal to 1, or motion_prediction_flag_lx[ ] is equal to 1, we refer to these macroblocks as inter-layer predicted macroblocks.

The slice header flag base_pred_weight_table_flag currently takes 2 values, either a 0 or a 1. A value of 0 Indicates that the enhancement layer (EL) weights will be transmitted. A value of 1 indicates that the base layer (BL) weights should be inherited for the enhancement layer.

For the inter-layer prediction modes, the H.264 standard does not clearly specify which set of weights to use. In order to clarify these cases with respect to the present principles, five exemplary embodiments are provided, as described with respect to the methods of FIGS. 3 through 12. Of course, the present principles are not limited to solely the five described exemplary embodiments and, given the teachings of the present principles provided herein, one of ordinary skill in this and related arts will contemplate these and various other embodiments while maintaining the scope of the present principles.

In the first and second exemplary embodiments, we clarify the use of the base_pred_weight_table_flag when it is equal to 0 for an inter-layer predicted macroblock without any syntax changes. In the third exemplary embodiment, the method of the first prior art approach described above is extended by adding a new syntax element in the macroblock layer, base_mode_weight_flag, which indicates on a macroblock basis which set of weights are to be used in the enhancement layer for the inter-layer predicted macroblocks. In the fourth exemplary method, base_pred_weight_table_flag is extended to take three values as described below. In the fifth exemplary method, we extend the fourth method to add a syntax element, base_mode_weight_flag, at the macroblock layer to indicate whether BL weights or EL weights are to be used.

Herein below, Table 1 illustrates slice header syntax for the first, second, and third exemplary embodiments. Table 2 illustrates slice header syntax for the fourth and fifth exemplary embodiments. Table 3 illustrates macroblock layer syntax for the third exemplary embodiment. Table 4 illustrates macroblock layer syntax for the fifth exemplary embodiment.

TABLE 1

| slice_header_in_scalable_extension( ) { | C | Descriptor |
|---|---|---|
|     first_mb_in_slice | 2 | ue(v) |
|     slice_type | 2 | ue(v) |
|     pic_parameter_set_id | 2 | ue(v) |
|     if( slice_type == PR ) { | | |
|         num_mbs_in_slice_minus1 | 2 | ue(v) |
|         luma_chroma_sep_flag | 2 | u(1) |
|     } | | |
|     frame_num | 2 | u(v) |
|     if( !frame_mbs_only_flag ) { | | |
|         field_pic_flag | 2 | u(1) |
|         if( field_pic_flag ) | | |
|             bottom_field_flag | 2 | u(1) |
|     } | | |
|     if( nal_unit_type == 21 ) | | |
|         idr_pic_id | 2 | ue(v) |
|     if( pic_order_cnt_type == 0 ) { | | |
|         pic_order_cnt_lsb | 2 | u(v) |
|         if( pic_order_present_flag && !field_pic_flag ) | | |
|             delta_pic_order_cnt_bottom | 2 | se(v) |
|     } | | |
|     if( pic_order_cnt_type == 1 && !delta_pic_order_always_zero_flag ) { | | |
|         delta_pic_order_cnt[ 0 ] | 2 | se(v) |
|         if( pic_order_present_flag && !field_pic_flag ) | | |
|             delta_pic_order_cnt[ 1 ] | 2 | se(v) |
|     } | | |
|     if( slice_type != PR ) { | | |
|         if( redundant_pic_cnt_present_flag ) | | |
|             redundant_pic_cnt | 2 | ue(v) |
|         if( slice_type == EB ) | | |
|             direct_spatial_mv_pred_flag | 2 | u(1) |
|         key_picture_flag | 2 | u(1) |
|         decomposition_stages | 2 | ue(v) |
|         base_id_plus1 | 2 | ue(v) |
|         if( base_id_plus1 != 0) { | | |
|             adaptive_prediction_flag | 2 | u(1) |
|         } | | |
|         if( slice_type == EP || slice_type == EB ) { | | |
|             num_ref_idx_active_override_flag | 2 | u(1) |
|             if( num_ref_idx_active_override_flag ) { | | |
|                 num_ref_idx_l0_active_minus1 | 2 | ue(v) |
|                 if( slice_type == EB ) | | |
|                     num_ref_idx_l1_active_minus1 | 2 | ue(v) |
|             } | | |
|         } | | |
|         ref_pic_list_reordering( ) | 2 | |
|         for( decLvl = temporal_level; decLvl < decomposition_stages; decLvl++ ) | | |
|         { | | |
|             num_ref_idx_update_l0_active[ decLvl + 1 ] | 2 | ue(v) |
|             num_ref_idx_update_l1_active[ decLvl + 1 ] | 2 | ue(v) |
|         } | | |
|         if( ( weighted_pred_flag && slice_type == EP ) || | | |
|           ( weighted_bipred_idc == 1 && slice_type == EB ) ) | | |
|         { | | |
|             if ( (base_id_plus1 != 0) && ( adaptive_prediction_flag == 1) ) | | |
|                 base_pred_weight_table_flag | 2 | u(1) |
|             if ( base_pred_weight_table_flag == 0) | | |
|                 pred_weight_table( ) | 2 | |
|         } | | |
|         if( nal_ref_idc != 0 ) | | |
|             dec_ref_pic_marking( ) | 2 | |
|         if( entropy_coding_mode_flag && slice_type != EI ) | | |
|             cabac_init_idc | 2 | ue(v) |
|     } | | |
|     slice_qp_delta | 2 | se(v) |
|     if( deblocking_filter_control_present_flag ) { | | |
|         disable_deblocking_filter_idc | 2 | ue(v) |
|         if( disable_deblocking_filter_idc != 1 ) { | | |
|             slice_alpha_c0_offset_div2 | 2 | se(v) |
|             slice_beta_offset_div2 | 2 | se(v) |
|         } | | |
|     } | | |

TABLE 1-continued

| slice_header_in_scalable_extension( ) { | C | Descriptor |
|---|---|---|
|     if( slice_type != PR ) | | |
|         if( num_slice_groups_minus1 > 0 && | | |
|             slice_group_map_type >= 3 && slice_group_map_type <= 5) | | |
|             slice_group_change_cycle | 2 | u(v) |
|     if( slice_type != PR && extended_spatial_scalability > 0 ) { | | |
|         if ( chroma_format_idc > 0 ) { | | |
|             base_chroma_phase_x_plus1 | 2 | u(2) |
|             base_chroma_phase_y_plus1 | 2 | u(2) |
|         } | | |
|         if( extended_spatial_scalability == 2 ) { | | |
|             scaled_base_left_offset | 2 | se(v) |
|             scaled_base_top_offset | 2 | se(v) |
|             scaled_base_right_offset | 2 | se(v) |
|             scaled_base_bottom_offset | 2 | se(v) |
|         } | | |
|     } | | |
|     SpatialScalabilityType = spatial_scalability_type( ) | | |
| } | | |

TABLE 2

| slice_header_in_scalable_extension( ) { | C | Descriptor |
|---|---|---|
|     first_mb_in_slice | 2 | ue(v) |
|     slice_type | 2 | ue(v) |
|     pic_parameter_set_id | 2 | ue(v) |
|     if( slice_type == PR ) { | | |
|         num_mbs_in_slice_minus1 | 2 | ue(v) |
|         luma_chroma_sep_flag | 2 | u(1) |
|     } | | |
|     frame_num | 2 | u(v) |
|     if( !frame_mbs_only_flag ) { | | |
|         field_pic_flag | 2 | u(1) |
|         if( field_pic_flag ) | | |
|             bottom_field_flag | 2 | u(1) |
|     } | | |
|     if( nal_unit_type == 21 ) | | |
|         idr_pic_id | 2 | ue(v) |
|     if( pic_order_cnt_type == 0 ) { | | |
|         pic_order_cnt_lsb | 2 | u(v) |
|         if( pic_order_present_flag && !field_pic_flag ) | | |
|             delta_pic_order_cnt_bottom | 2 | se(v) |
|     } | | |
|     if( pic_order_cnt_type == 1 && !delta_pic_order_always_zero_flag ) { | | |
|         delta_pic_order_cnt[ 0 ] | 2 | se(v) |
|         if( pic_order_present_flag && !field_pic_flag ) | | |
|             delta_pic_order_cnt[ 1 ] | 2 | se(v) |
|     } | | |
|     if( slice_type != PR ) { | | |
|         if( redundant_pic_cnt_present_flag ) | | |
|             redundant_pic_cnt | 2 | ue(v) |
|         if( slice_type == EB ) | | |
|             direct_spatial_mv_pred_flag | 2 | u(1) |
|         key_picture_flag | 2 | u(1) |
|         decomposition_stages | 2 | ue(v) |
|         base_id_plus1 | 2 | ue(v) |
|         if( base_id_plus1 != 0 ) { | | |
|             adaptive_prediction_flag | 2 | u(1) |
|         } | | |
|         if( slice_type == EP || slice_type == EB ) { | | |
|             num_ref_idx_active_override_flag | 2 | u(1) |
|             if( num_ref_idx_active_override_flag ) { | | |
|                 num_ref_idx_l0_active_minus1 | 2 | ue(v) |
|                 if( slice_type == EB ) | | |
|                     num_ref_idx_l1_active_minus1 | 2 | ue(v) |
|             } | | |
|         } | | |
|         ref_pic_list_reordering( ) | 2 | |
|         for( decLvl = temporal_level; decLvl < decomposition stages; decLvl++ ) | | |
|         { | | |
|             num_ref_idx_update_l0_active[ decLvl + 1 ] | 2 | ue(v) |

TABLE 2-continued

| slice_header_in scalable_extension( ) { | C | Descriptor |
|---|---|---|
|         num_ref_idx_update_l1_active[ decLvl + 1 ] | 2 | ue(v) |
|   } | | |
|   if( ( weighted_pred_flag && slice_type = = EP ) \|\| | | |
|     ( weighted_bipred_idc = = 1 && slice_type = = EB ) ) | | |
|   { | | |
|     if ( ( (base_id_plus1 != 0) && ( adaptive_prediction_flag = = 1 ) ) | | |
|       base_pred_weight_table_flag | 2 | u(2) |
|     if ( ( ( base_pred_weight_table_flag = = 0) \|\| | | |
|       ( base_pred_weight_table_flag = = 2 ) ) | | |
|       pred_weight_table( ) | 2 | |
|   } | | |
|   if( nal_ref_idc != 0 ) | | |
|     dec_ref_pic_marking( ) | 2 | |
|   if( entropy_coding_mode_flag && slice_type != EI ) | | |
|     cabac_init_idc | 2 | ue(v) |
| } | | |
| slice_qp_delta | 2 | se(v) |
| if( deblocking_filter_control_present_flag ) { | | |
|   disable deblocking_filter_idc | 2 | ue(v) |
|   if( disable_deblocking_filter_idc != 1 ) { | | |
|     slice_alpha_c0_offset_div2 | 2 | se(v) |
|     slice_beta_offset_div2 | 2 | se(v) |
|   } | | |
| } | | |
| if( slice_type != PR ) | | |
|   if( num_slice_groups_minus1 > 0 && | | |
|     slice_group_map_type >= 3 && slice_group_map_type <= 5) | | |
|     slice_group_change_cycle | 2 | u(v) |
| if( slice_type != PR && extended_spatial_scalability > 0 ) { | | |
|   if ( chroma_format_idc > 0 ) { | | |
|     base_chroma_phase_x_plus1 | 2 | u(2) |
|     base_chroma_phase_y_plus1 | 2 | u(2) |
|   } | | |
|   if( extended_spatial_scalability = = 2 ) { | | |
|     scaled_base_left_offset | 2 | se(v) |
|     scaled_base_top_offset | 2 | se(v) |
|     scaled_base_right_offset | 2 | se(v) |
|     scaled_base_bottom_offset | 2 | se(v) |
|   } | | |
| } | | |
| SpatialScalabilityType = spatial_scalability_type( ) | | |
| } | | |

TABLE 3

| macroblock_layer in scalable extension( ) { | C | Descriptor |
|---|---|---|
| if( in_crop_window( CurrMbAddr ) ) | | |
|   If( (base_pred_weight_table_flag == 0) && | | |
|     (slice type == EP \|\| slice_type == EB) ) | | |
|     base_mode weight_flag | 2 | ae(v) |
|   if(adaptive_prediction_flag ) { | | |
|     base_mode_flag | 2 | ae(v) |
|     if( ! base_mode_flag && SpatialScalabilityType > 0 && | | |
|       ! intra_base_mb( CurrMbAddr ) ) | | |
|       base_mode_refinement_flag | 2 | ae(v) |
|   } | | |
| } | | |
| if( ! base_mode_flag && ! base_mode_refinement_flag ) { | | |
|   mb_type | 2 | ae(v) |
|   if( mb_type = = I_NxN && in_crop_window( CurrMbAddr ) && | | |
|     ( intra_base_mb( CurrMbAddr ) \|\| ! constrained_inter_layer_pred( ) ) ) | | |
|     intra_base_flag | 2 | ae(v) |
| } | | |
| if( mb_type = = I_PCM ) { | | |
|   while( !byte_aligned( ) ) | | |
|     pcm_alignment_zero_bit | 2 | f(l) |
|   for( i = 0; i < 256; i++ ) | | |
|     pcm_sample_luma[ i ] | 2 | u(v) |
|   for( i = 0; i < 2 * MbWidthC * MbHeightC; i++ ) | | |
|     pcm_sample_chroma[ i ] | 2 | u(v) |
| } else { | | |
|   NoSubMbPartSizeLessThan8x8Flag = 1 | | |
|   if( mb_type != I_NxN && | | |
|     MbPartPredMode( mb_type, 0 ) != Intra_16x16 && | | |

TABLE 3-continued

| macroblock_layer in scalable extension( ) { | C | Descriptor |
|---|---|---|
|         NumMbPart( mb_type ) = = 4 ) { | | |
|           sub_mb_pred_in_scalable_extension( mb_type ) | 2 | |
|           for( mbPartIdx = 0; mbPartIdx < 4; mbPartIdx++ ) | | |
|               if( sub_mb_type[ mbPartIdx ] != B_Direct_8x8 ) { | | |
|                   if( NumSubMbPart( sub_mb_type [ mbPartIdx ] ) > 1 ) | | |
|                       NoSubMbPartSizeLessThan8x8Flag = 0 | | |
|               } else if( !direct_8x8_inference_flag ) | | |
|                   NoSubMbPartSizeLessThan8x8Flag = 0 | | |
|         } else { | | |
|           if( transform_8x8_mode_flag && mb_type = = I_NxN ) | | |
|               transform_size_8x8_flag | 2 | ae(v) |
|           mb_pred_in_scalable_extension( mb_type ) | 2 | |
|         } | | |
|     if( MbPartPredMode( mb_type, 0 ) != Intra_16x16 ) { | | |
|         coded_block_pattern | 2 | ae(v) |
|         if( CodedBlockPatternLuma > 0 && | | |
|             transform_8x8_mode_flag && mb_type != I NxN && | | |
|             NoSubMbPartSizeLessThan8x8Flag && | | |
|             !( MbPartPredMode( mb_type, 0 ) == B_Direct_16x16 && | | |
|               !direct_8x8_inference+flag ) ) | | |
|           transform_size_8x8_flag | 2 | ae(v) |
|     } | | |
|     if( CodedBlockPatternLuma > 0 || CodedBlockPatternChroma > 0 || | | |
|         MbPartPredMode( mb_type, 0 ) == Intra_16x16 { | | |
|         mb_qp_delta | 2 | ae(v) |
|         residual in_scalable_extension( ) | 3\|4 | |
|     } | | |
|   } | | |
| } | | |

TABLE 4

| macroblock layer in scalable_extension( ) { | C | Descriptor |
|---|---|---|
|   if( in_crop_window( CurrMbAddr ) ) | | |
|     If( ((base_pred_weight_table_flag == 0) \|\| | | |
|         (base_pred_weight_table_flag == 2)) && | | |
|         (slice_type == EP \|\| slice_type == EB) ) | | |
|         base_mode_weight_flag | 2 | ae(v) |
|     if(adaptive_prediction_flag ) { | | |
|         base_mode_flag | 2 | ae(v) |
|         if( ! base_mode_flag && SpatialScalabilityType > 0 && | | |
|           ! intra_base_mb( CurrMbAddr ) ) | | |
|         base_mode_refinement_flag | 2 | ae(v) |
|     } | | |
|   } | | |
|   if( ! base_mode_flag && ! base_mode_refinement_flag ) { | | |
|     mb_type | 2 | ae(v) |
|     if( mb_type = = I_NxN && in_crop_window( CurrMbAddr ) && | | |
|         ( intra_base_mb( CurrMbAddr ) \|\| ! constrained_inter_layer_pred( ) ) ) | | |
|         intra_base_flag | 2 | ae(v) |
|   } | | |
|   if( mb_type = = I_PCM ) { | | |
|     while( !byte_aligned( ) ) | | |
|         pcm_alignment_zero_bit | 2 | f(1) |
|     for( i = 0; i < 256; i++ ) | | |
|         pcm_sample_luma[ i ] | 2 | u(v) |
|     for( i = 0; i < 2 * MbWidthC * MbHeightC; i++ ) | | |
|         pcm_sample_chroma[ i ] | 2 | u(v) |
|   } else { | | |
|     NoSubMbPartSizeLessThan8x8Flag = 1 | | |
|     if( mb_type != I_NxN && | | |
|         MbPartPredMode( mb_type, 0 ) != Intra_16x16 && | | |
|         NumMbPart( mb_type ) = = 4 ) { | | |
|         sub_mb_pred_in_scalable_extension( mb_type ) | 2 | |
|         for( mbPartIdx = 0; mbPartIdx < 4; mbPartIdx++ ) | | |
|             if( sub_mb_type[ mbPartIdx ] != B_Direct_8x8 ) { | | |
|                 if( NumSubMbPart( sub_mb_type [ mbPartIdx ] ) > 1 ) | | |
|                     NoSubMbPartSizeLessThan8x8Flag = 0 | | |
|             } else if( !direct_8x8_inference_flag ) | | |
|                 NoSubMbPartSizeLessThan8x8Flag = 0 | | |
|     } else { | | |
|         if( transform_8x8_mode_flag && mb_type = = I_NxN ) | | |
|             transform_size_8x8_flag | 2 | ae(v) |
|         mb_pred_in_scalable_extension( mb_type ) | 2 | |

TABLE 4-continued

| macroblock layer in scalable_extension( ) { | C | Descriptor |
|---|---|---|
| }<br>    if( MbPartPredMode( mb_type, 0 ) != Intra_16x16) {<br>        coded_block_pattern | 2 | ae(v) |
|         if( CodedBlockPatternLuma > 0 &&<br>            transform_8x8_mode_flag && mb_type != I_NxN &&<br>            NoSubMbPartSizeLessThan8x8Flag &&<br>            !( MbPartPredMode( mb_type, 0 ) == B_Direct_16x16 &&<br>                !direct_8x8_inference_flag ) )<br>            transform_size_8x8_flag | 2 | ae(v) |
|     }<br>    if( CodedBlockPatternLuma > 0 \|\| CodedBlockPatternChroma > 0 \|\|<br>        MbPartPredMode( mb_type, 0 ) == Intra_16x16 ) {<br>        mb_qp_delta | 2 | ae(v) |
|         residual_in_scalable_extension( ) | 3\|4 | |
|     }<br>  }<br>} | | |

A description will now be given regarding the first exemplary embodiment. In the first exemplary embodiment, we do not change any syntax elements. When base_pred_weight_table_flag is equal to 0 and when the enhancement layer macroblock is an inter-layer macroblock, it seems intuitive to use the base layer weights to weight the corresponding macroblock. As a result, the decoder should also be aware of this fact. Thus, we propose a semantic change for motion_prediction_flag_lx[ ], base_mode_flag, and base_mode_refinement_flag. In particular, we propose to add the following line to the already existing definition of the syntax:

motion_prediction_flag_l0[mbPartIdx] equal to 1 specifies that the base layer pred_weight_table( ) will be used to perform weighted prediction on the current macroblock.

base_mode_flag equal to 1 specifies that the base layer pred_weight_table( ) will be used to perform weighted prediction on the current macroblock.

base_mode_refinement_flag equal to 1 specifies that that the base layer pred_weight_table( ) will be used to perform weighted prediction on the current macroblock.

Figure 3:
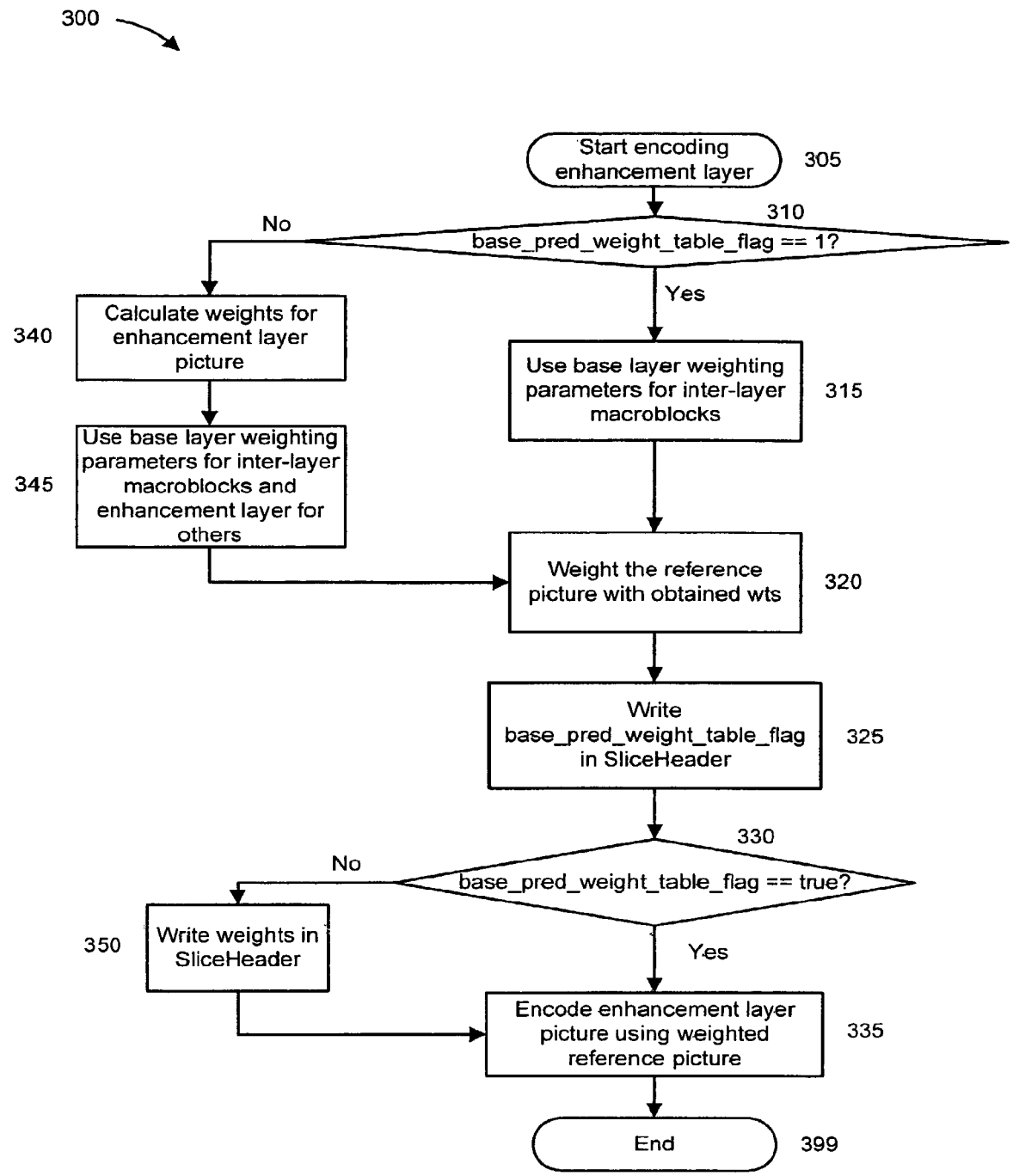
FIG. 3 shows a flow diagram for a method for encoding an enhancement layer in accordance with an exemplary first embodiment of the present principles.

Turning to FIG. 3, a method for encoding an enhancement layer using weighted prediction is indicated generally by the reference numeral 300. The method 300 includes a start block 305 that starts encoding the enhancement layer, and passes control to a decision block 310. The decision block 310 determines whether or not base_pred_weight_table_flag is equal to 1. If so, then control is passed to a function block 315. Otherwise, control is passed to a function block 340.

The function block 315 uses base layer weighting parameters for inter-layer macroblocks, and passes control to function block 320. The function block 320 weights the reference picture with the obtained weights, and passes control to a function block 325. The function block 325 writes base_pred_weight_table_flag in a slice header corresponding to the enhancement layer, and passes control to a decision block 330. The decision block 330 determines whether or not base_pred_weight_table_flag is equal to 1 (true). If so, then control is passed to a function block 335. Otherwise, control is passed to a function bock 350.

The function block 335 encodes an enhancement layer picture using the weighted reference picture, and passes control to an end block 399.

The function block 350 writes the weights in the slice header, and passes control to the function block 335.

The function block 340 calculates the weights for the enhancement layer picture, and passes control to a function block 345. The function block 345 uses the base layer weighting parameters for inter-layer macroblocks in the enhancement layer picture and enhancement layer weighting parameters for the other macroblocks in the enhancement layer picture, and passes control to the function block 320.

Figure 4:
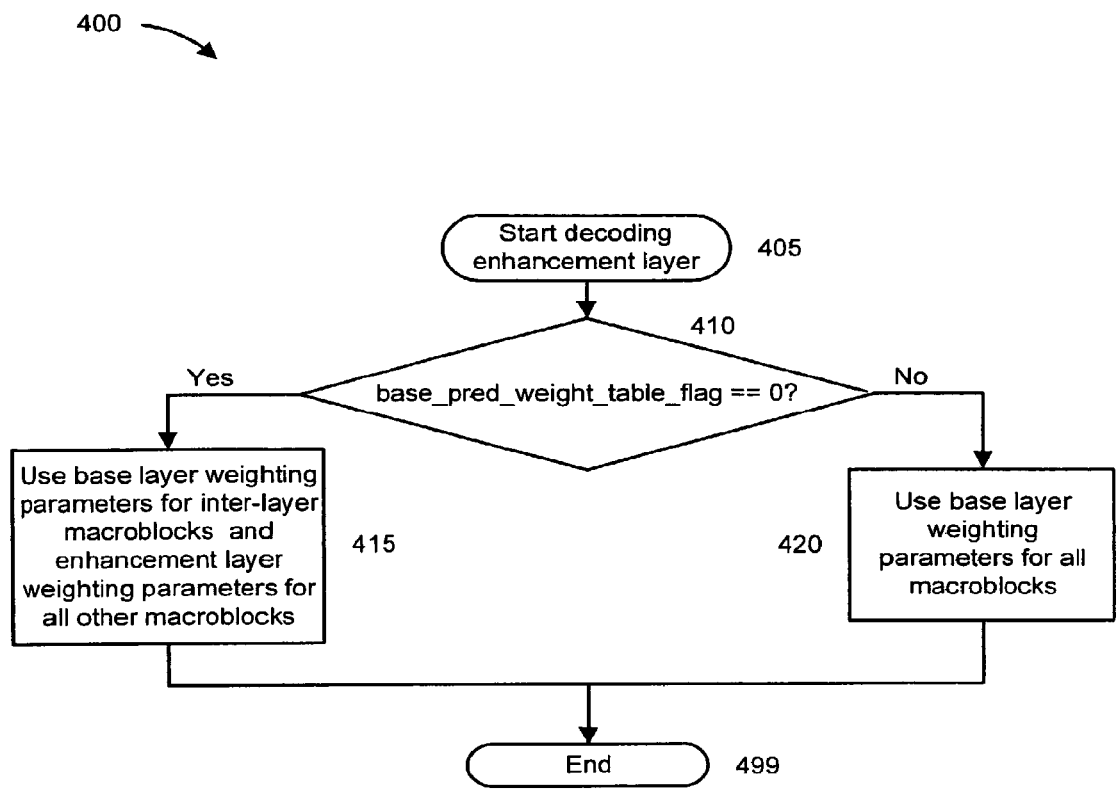
FIG. 4 shows a flow diagram for a method for decoding an enhancement layer in accordance with the exemplary first embodiment of the present principles.

Turning to FIG. 4, a method for decoding an enhancement layer using weighted prediction is indicated generally by the reference numeral 400. The method 400 includes a start block 405 that starts decoding the enhancement layer and passes control to a decision block 410. The decision block 410 determines whether or not base_pred_weight_table_flag is equal to 0. If so, then control is passed to a function block 415. Otherwise, control is passed to a function block 420.

The function block 415 uses base layer weighting parameters for inter-layer macroblocks, enhancement layer weighting parameters for all other macroblocks, and passes control to an end block 499.

The function block 420 uses the base layer weighting parameters for all macroblocks, and passes control to the end block 499.

A description will now be provided regarding the second exemplary method. The motivation of the second exemplary method is similar to the first, except we change the semantics of motion_prediction_flag_lx[ ], base_mode_flag, and base_mode_refinement_flag as follows. When base_pred_weight_table_flag is equal to 0, the enhancement layer always uses the enhancement layer weights and never the base layer weights.

motion_prediction_flag_l0[mbPartIdx] equal to 1 specifies that the enhancement layer pred_weight_table( ) will be used to perform weighted prediction on the current macroblock.

base_mode_flag equal to 1 specifies that the enhancement layer pred_weight_table( ) will be used to perform weighted prediction on the current macroblock.

base_mode_refinement_flag equal to 1 specifies that that the enhancement layer pred_weight_table( ) will be used to perform weighted prediction on the current macroblock.

Figure 5:
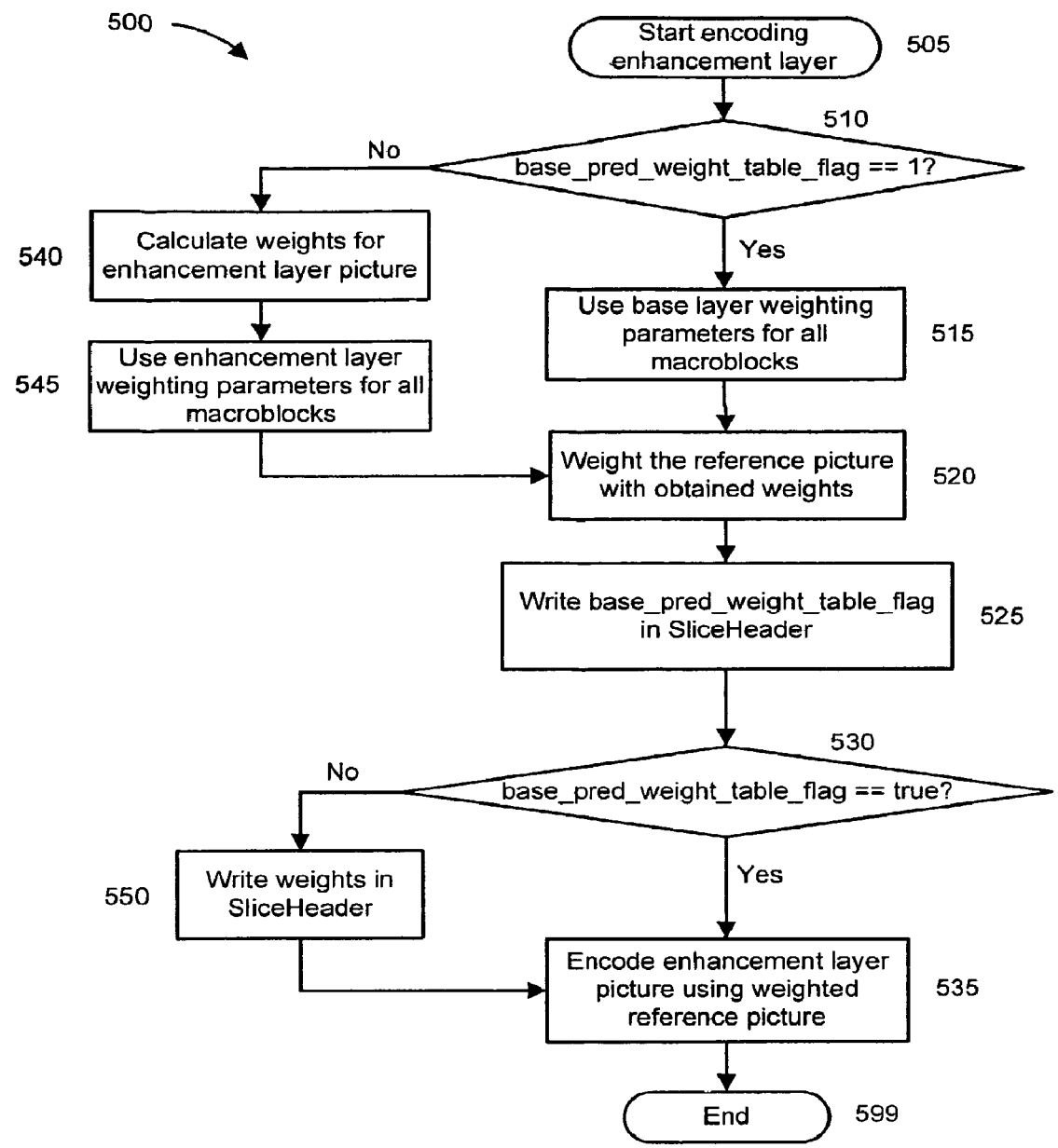
FIG. 5 shows a flow diagram for a method for encoding an enhancement layer in accordance with an exemplary second embodiment of the present principles.

Turning to FIG. 5, a method for encoding an enhancement layer using weighted prediction is indicated generally by the reference numeral 500. The method includes a start block 505 that starts encoding the enhancement layer, and passes control to a decision block 510. The decision block 510 determines whether or not base_pred_weight_table_flag is equal to one. If so, then control is passed to a function block 515. Otherwise, control is passed to a function block 540.

The function block 515 uses the base layer weighting parameters for all macroblocks, and passes control to a function block 520. The function block 520 weights a reference picture with the obtained weights, and passes control to a function block 525. The function block 525 writes base_pred_weight_table_flag in a slice header corresponding to the enhancement layer, and passes control to a decision block 530. The decision block 530 determines whether or not base_pred_weight_table_flag is equal to 1 (true). If so, then control is passed to a function block 535. Otherwise, control is passed to a function block 550.

The function block 535 encodes an enhancement layer picture using the weighted reference picture, and passes control to an end block 599.

The function block 550 writes the weights in the slice header, and passes control to the function block 535.

The function block 540 calculates weights for the enhancement layer picture, and passes control to a function block 545. The function block 545 uses the enhancement layer weighting parameters for all macroblocks, and passes control to the function block 520.

Figure 6:
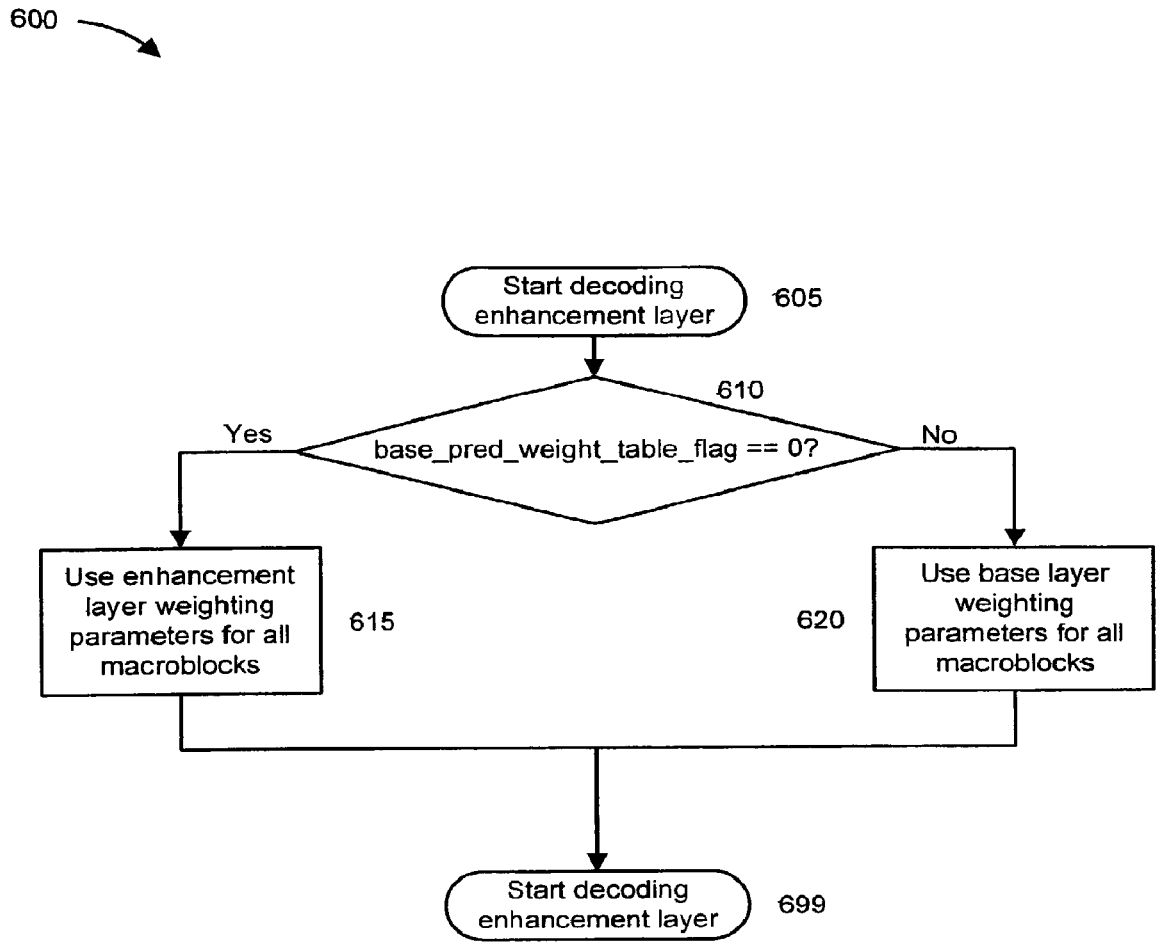
FIG. 6 shows a flow diagram for a method for decoding an enhancement layer in accordance with the exemplary second embodiment of the present principles.

Turning to FIG. 6, a method for decoding an enhancement layer using weighted prediction is indicated generally by the reference numeral 600. The method 600 includes a start block 605 that starts decoding the enhancement layer and passes control to a decision block 610. The decision block 610 determines whether or not the base_pred_weight_table_flag is equal to 0. If so, then control is passed to a function block 615. Otherwise, control is passed to a function block 620.

The function block 615 uses the enhancement layer weighting parameters for all macroblocks, and passes control to an end block 699.

The function block 620 uses the base layer weighting parameters for all macroblocks, and passes control to the end block 699.

A description will now be given regarding the third exemplary embodiment. In the third exemplary embodiment, we keep the existing slice header syntax, base_pred_weight_table_flag, but add a new syntax element, base_mode_weight_flag, in the macroblock layer as shown in Table 3.

base_mode_weight_flag equal to 1 specifies that the weighting parameters shall be inferred in dependence of the corresponding base macroblocks. base_mode_weight_flag equal to 0 specifies that the weighting parameters are not inferred.

This flag is only present when base_pred_weight_table_flag is equal to 0. In this case, the encoder can use a rate distortion optimization (RDO) technique to decide which set of weights provides the best performance for the current enhancement layer inter-layer predicted macroblock. If using the base layer weights provides better performance, then base_mode_weight_flag is set to 1; otherwise, base_mode_weight_flag is set to 0. The decoder can then decode base_mode_weight_flag and determine which set of weighting parameters are to be used to reconstruct the current MB.

Figure 7:
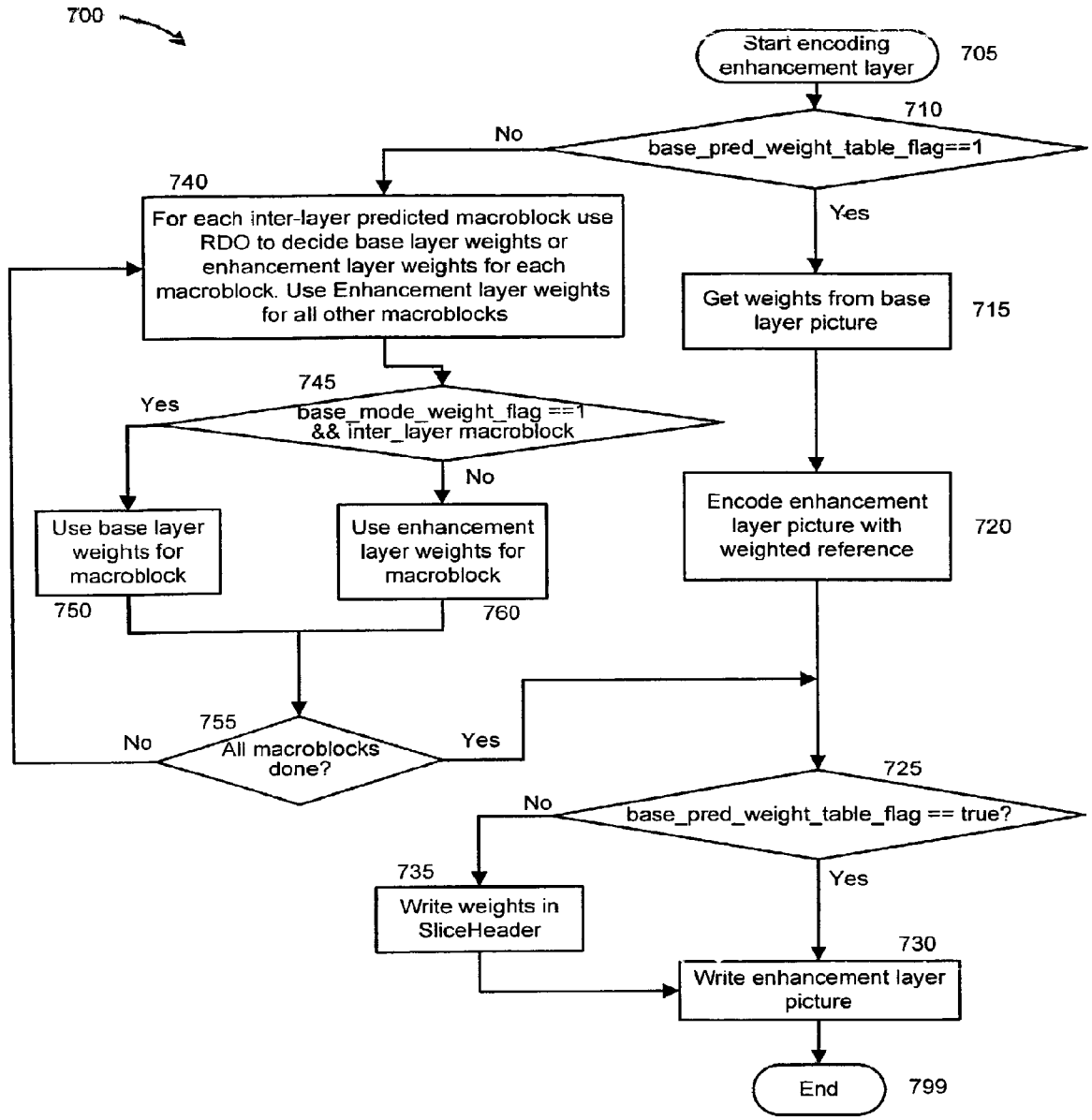
FIG. 7 shows a flow diagram for a method for encoding an enhancement layer in accordance with an exemplary third embodiment of the present principles.

Turning to FIG. 7, a method for encoding an enhancement layer using weighted prediction is indicated generally by the reference numeral 700. The method 700 includes a start block 705 that starts encoding the enhancement layer, and passes control to a decision block 710. The decision block 710 determines whether or not base_pred_weight_table_flag is equal to 1. If so, then control is passed to a function block 715. Otherwise, control is passed to a function block 740.

The function block 715 obtains weights from a base layer picture, and passes control to a function block 720. The function block 720 encodes an enhancement layer picture with a weighted reference picture, and passes control to a decision block 725. The decision block 725 determines whether or not base_pred_weight_table_flag is equal to 1 (true). If so, then control is passed to a function block 730. Otherwise, control is passed to a function block 735.

The function block 730 writes the enhancement layer picture, and passes control to an end block 799.

The function block 735 writes the weights in a slice header corresponding to the enhancement layer, and passes control to the function block 730.

The function block 740 uses a rate distortion optimization (RDO) technique to decide the base layer weights or the enhancement layer weights for each inter-layer predicted macroblock, uses the enhancement layer weights for all other macroblocks, and passes control to a decision block 745. The decision block 745 determines whether or not base_mode_weight_flag is equal to 1 and whether or not the current macroblock is an inter-layer predicted macroblock. If so, then control is passed to a function block 750. Otherwise, control is passed to a function block 760.

The function block 750 uses the base layer weights for the current macroblock, and passes control to a decision block 755.

The function block 760 uses the enhancement layer weights for the current macroblock, and passes control to the decision block 755.

The decision block 755 determines whether or not all macroblocks have been weighted. If so, then control is passed to the decision block 725. Otherwise, control is returned to the function block 740.

Figure 8:
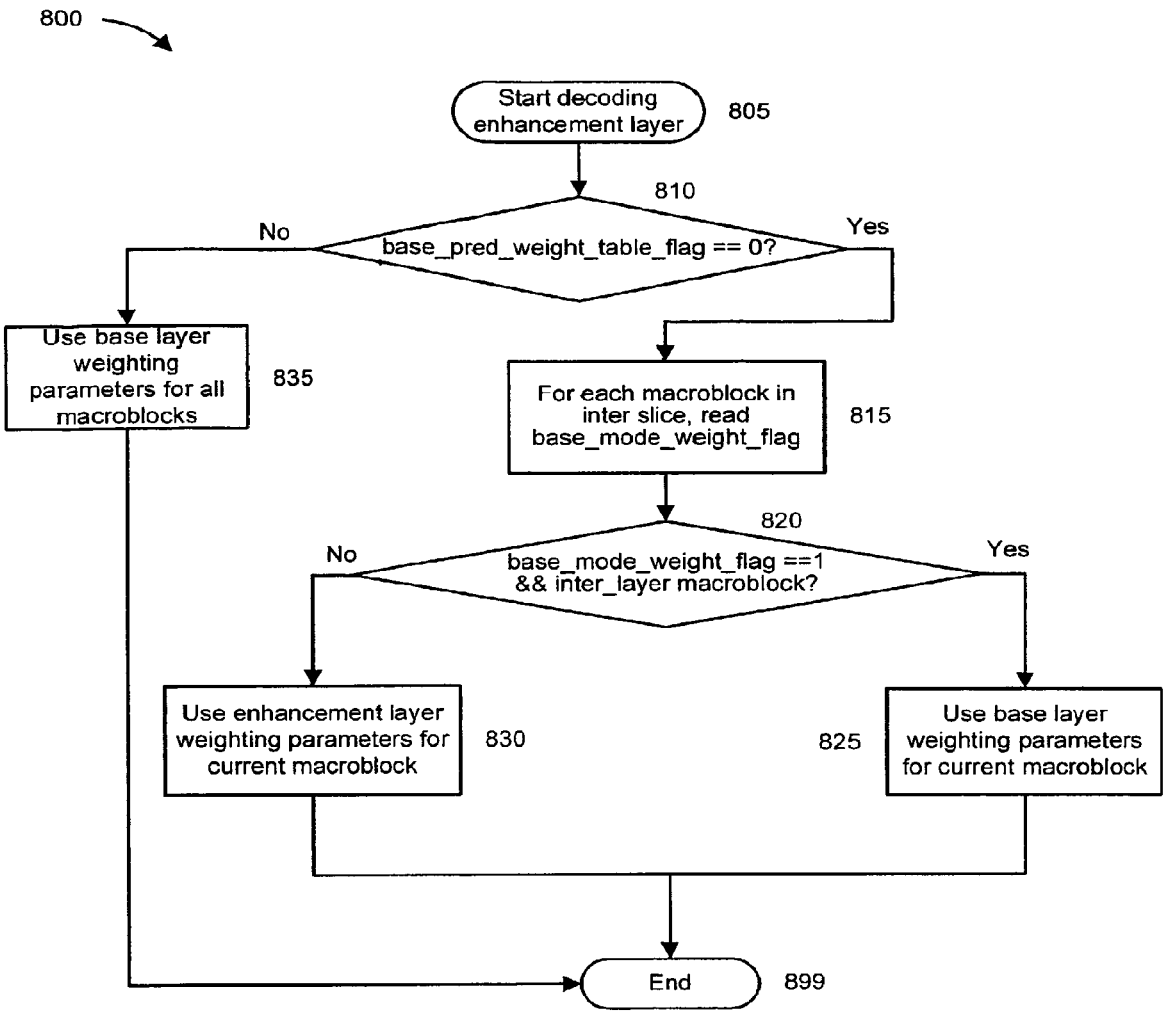
FIG. 8 shows a flow diagram for a method for decoding an enhancement layer in accordance with the exemplary third embodiment of the present principles.

Turning to FIG. 8, a method for decoding an enhancement layer using weighted prediction is indicated generally by the reference numeral 800. The method 800 includes a start block 805 that starts decoding the enhancement layer, and passes control to a decision block 810. The decision block 810 determines whether or not the base_pred_weight_table_flag is equal to 0. If so, then control is passed to a function block 815. Otherwise, control is passed to a function block 835.

The function block 815 reads base_mode_weight_flag for each macroblock in an inter-slice, and passes control to a decision block 820. The decision block 820 determines whether or not base_mode_weight_flag is equal to one, and whether a current macroblock is an inter layer macroblock. If so, then control is passed to a function block 825. Otherwise, control is passed to a function block 830.

The function block 825 uses base layer weighting parameters for the current macroblock, and passes control to an end block 899.

The function block 830 uses enhancement layer parameters for the current macroblock, and passes control to the end block 899.

The function block 835 uses the base layer weighting parameters for all macroblocks, and passes control to the end block 899.

A description will now be given regarding the fourth exemplary embodiment. In the fourth embodiment, we propose to change the base_pred_weight_table_flag syntax to assume three values and also change the semantics to reflect this change.

base_pred_weight_table_flag equal to 0 is similar to add_ref_num, in that the enhancement layer does not inherit weighting parameters from the base layer, except we clarify that for inter-layer prediction modes we always use the enhancement layer weights.

base_pred_weight_table_flag equal to 1 is similar to where we inherit the base layer weights for all the macroblocks in the enhancement layer.

base_pred_weight_table_flag equal to 2: in this case we propose to adaptively select between base layer weights and enhancement layer weights depending on the MB type. For inter-layer predicted macroblocks we propose to use base layer weights while for all other macroblocks we propose to use enhancement layer weights.

In the fourth method, the encoder decides which mode (0, 1, 2) to select on a slice basis. No additional syntax needs to be sent to indicate which set of weighting parameters is used for each macroblock. Mode 2 is especially useful when the base layer does not use weighted prediction but the enhancement layer uses weighted prediction and the sequence includes local intensity variations. This is because in pictures that include local intensity variations, two different weights for one reference picture can be selected. For those pictures which do not include such local intensity variations, we do not need to use weighting parameters.

Figure 9:
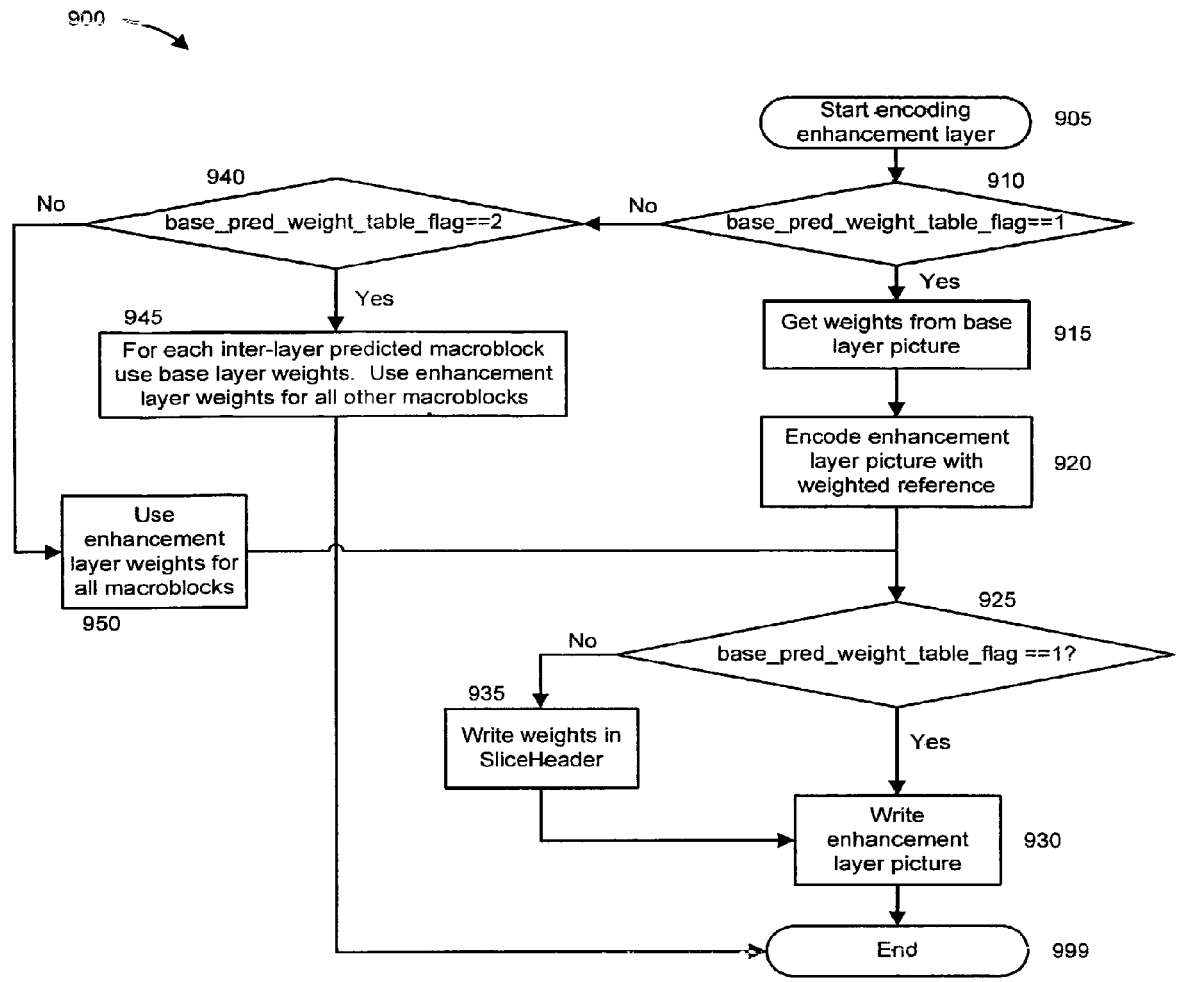
FIG. 9 shows a flow diagram for a method for encoding an enhancement layer in accordance with an exemplary fourth embodiment of the present principles.

Turning to FIG. 9, a method for encoding an enhancement layer using weighted prediction is indicated generally by the reference numeral 900. The method 900 includes a start block 905 that starts encoding the enhancement layer, and passes control to a decision block 910. The decision block 910 determines whether or not base_pred_weight_table_flag is equal to 1. If so, then control is passed to a function block 915. Otherwise, control is passed to a decision block 940.

The function block 915 obtains weights from a base layer picture, and passes control to a function block 920. The function block 920 encodes an enhancement layer picture with the weighted reference picture, and passes control to a decision block 925. The decision block 925 determines whether or not base_pred_weight_table_flag is equal to 1. If so, then control is passed to a function block 930. Otherwise, control is passed to a function block 935.

The function block 930 writes the enhancement layer picture, and passes control to an end block 999.

The function block 935 writes the weights in a slice header corresponding to the enhancement layer, and passes control to the function block 930.

The function block 940 determines whether or not base_pred_weight_table_flag is equal to 2. If so, then control is passed to a function block 945. Otherwise, control is passed to a function block 950.

The function block 945 uses the base layer weights for each inter-layer predicted macroblock, uses enhancement layer weights for all other macroblocks, and passes control to the decision block 925.

The function block 950 uses the enhancement layer weights for all macroblocks, and passes control to the decision block 925.

Figure 10:
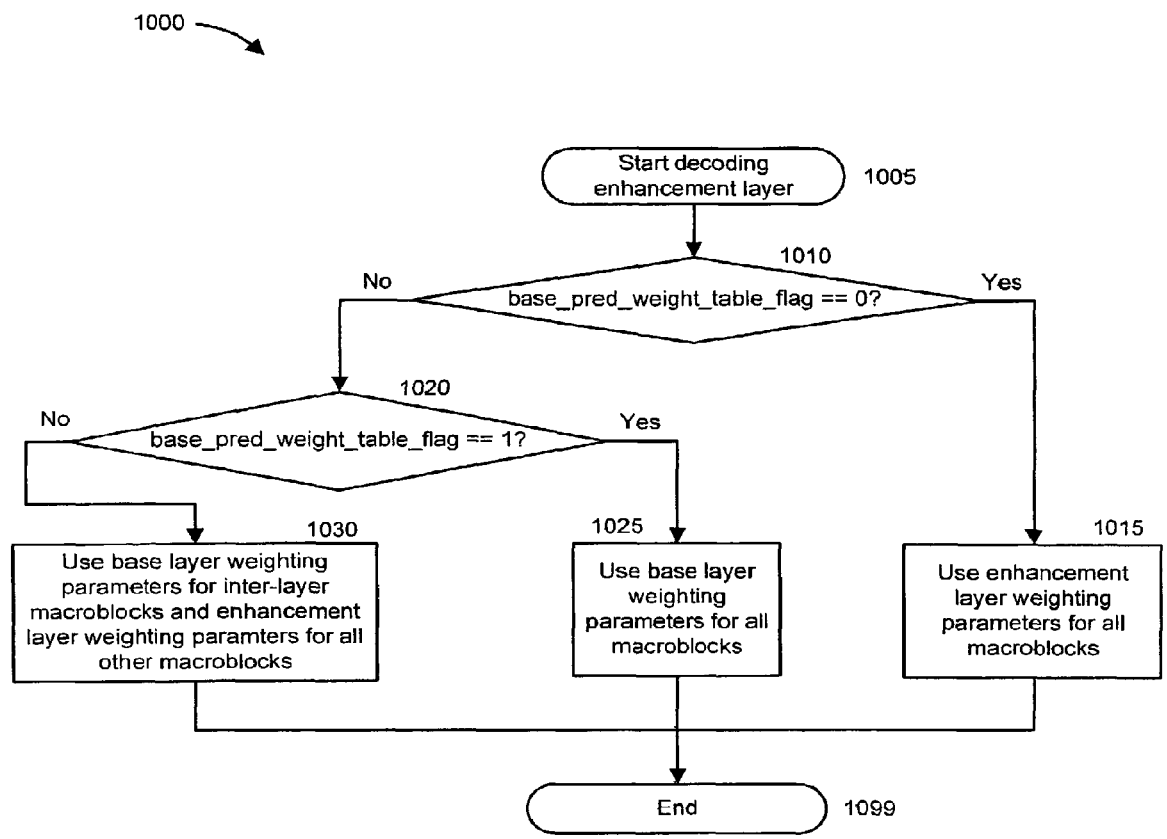
FIG. 10 shows a flow diagram for a method for decoding an enhancement layer in accordance with the exemplary fourth embodiment of the present principles.

Turning to FIG. 10, a method for decoding an enhancement layer using weighted prediction is indicated generally by the reference numeral 1000. The method includes a start block 1005 that starts decoding the enhancement layer, and passes control to a decision block 1010. The decision block 1010 determines whether or not base_pred_weight_table_flag is equal to 0. If so, then control is passed to a function block 1015. Otherwise, control is passed to a decision block 1020.

The function block 1015 uses enhancement layer weighting parameters for all macroblocks, and passes control to an end block 1099.

The decision block 1020 determines whether or not the base_pred_weight_table_flag is equal to 1. If so, then control is passed to a function block 1025. Otherwise, control is passed to a function block 1030.

The function block 1025 uses base layer weighting parameters for all macroblocks, and passes control to the end block 1099.

The function block 1030 uses the base layer weighting parameters for inter-layer macroblocks, uses the enhancement layer weighting parameters for all other macroblocks, and passes control to the end block 1099.

A description will now be given regarding the fifth exemplary embodiment. In the fifth embodiment, the approach of the fourth embodiment is extended and a new syntax element is added in the macroblock layer, base_mode_weight_flag, as shown in Table 4. We define this flag as defined above with respect to the third embodiment.

base_mode_weight_flag is only present when base_pred_weight_table_flag is equal to 0 or 2. Similar to the third method, the encoder can use a rate distortion optimization (RDO) technique to decide which set of weights provides the best performance for the current enhancement layer inter-layer predicted macroblock. If using base layer weights provides better performance, then base_mode_weight_flag is set to one; otherwise, base_mode_weight_flag is set to zero. The decoder can then decode base_mode_weight_flag and determine which set of weighting parameters are to be used to reconstruct the current macroblock.

Selecting weights adaptively can result in better coding efficiency for cases that have localized intensity changes such as, e.g., flashes, explosions, and so forth. Alternatively, when there is a global change in intensity such as, e.g., fading, it is proposed to simply use base_pred_weight_table_flag equal to 1.

Selecting weights adaptively requires that weighting parameters be stored on a macroblock basis instead of on a slice basis. This is because when we have more than 2 layers, the higher layers can again select the weighting parameters on a macroblock basis. Thus, using inter-layer prediction for the current layer requires knowing the weighting parameters of its corresponding lower layer.

Figure 11:
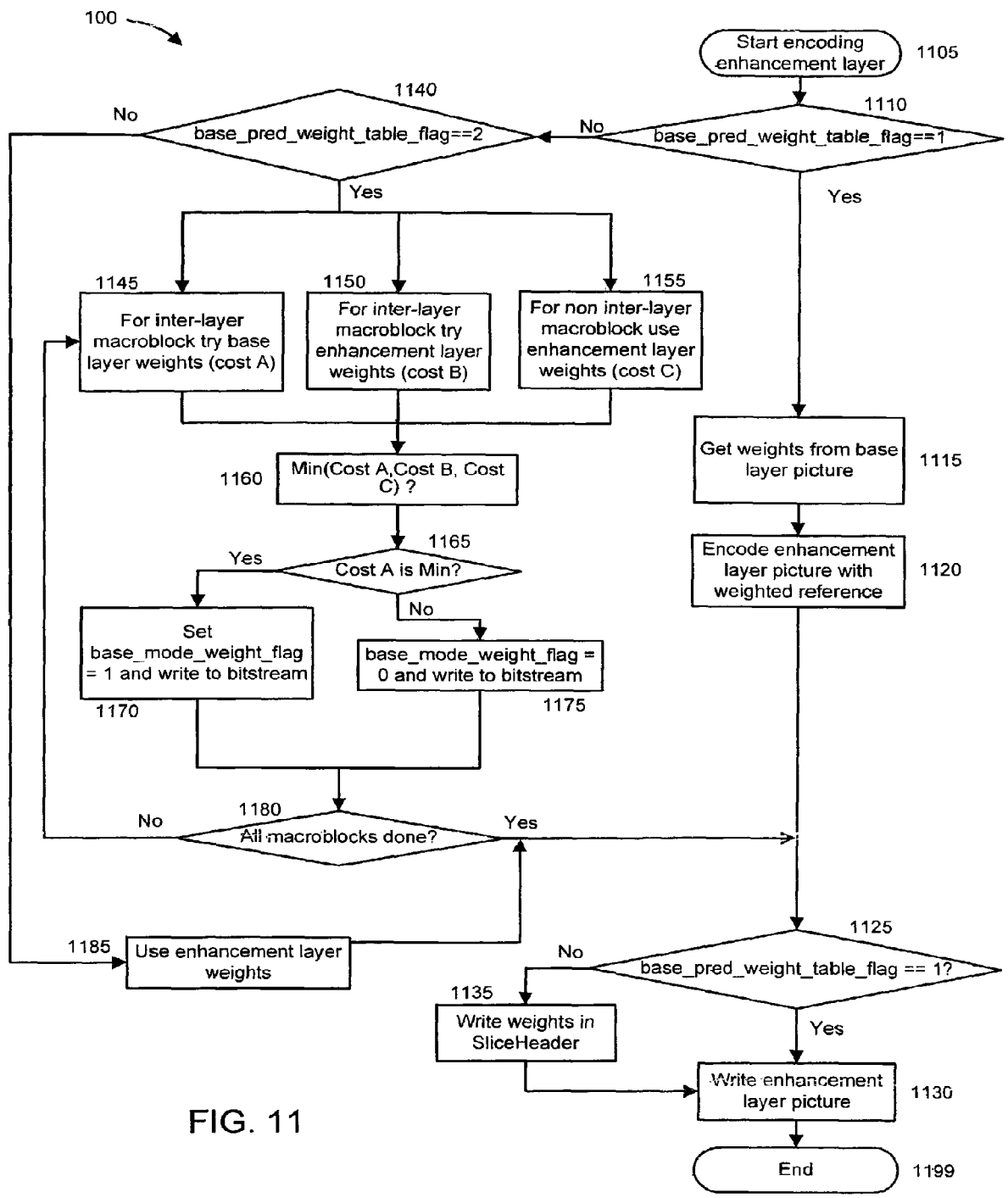
FIG. 11 shows a flow diagram for a method for encoding an enhancement layer in accordance with an exemplary fifth embodiment of the present principles.

Turning to FIG. 11, a method for encoding an enhancement layer using weighted prediction is indicated generally by the reference numeral 1100. The method includes a start block 1105 that starts encoding the enhancement layer, and passes control to a decision block 1110. The decision block 1110 determines whether or not base_pred_weight_table_flag is equal to 1. If so, then control is passed to a function block 1115. Otherwise, control is passed to a decision block 1140.

The function block 1115 obtains the weights from a base layer picture, and passes control to a function block 1120. The function block 1120 encodes an enhancement layer picture with a weighted reference picture, and passes control to a decision block 1125. The decision block 1125 determines whether or not base_pred_weight_table_flag is equal to 1. If so, then control is passed to a function block 1130. Otherwise, control is passed to a function block 1135.

The function block 1130 writes the enhancement layer picture, and passes control to an end block 1199.

The function block 1135 writes the weights in the slice header, and passes control to the function block 1130.

The decision block 1140 determines whether or not base_pred_weight_table_flag is equal to 2. If so, the control is passed to a function block 1145, a function block 1150, and a function block 1155.

The function block 1145 uses base layer weights for inter-layer macroblocks (Cost A), and passes control to a function block 1160.

The function block 1150 uses enhancement layer weights for the inter-layer macroblocks (Cost B), and passes control to the function block 1160.

The function block 1155 uses the enhancement layer weights for non-inter-layer macroblocks (Cost C), and passes control to the function block 1160.

The function block 1160 determines the minimum value from among Cost A, Cost B, and Cost C, and passes control to a decision block 1165. The decision block 1165 determines whether, or not Cost A has the minimum value. If so, the control is passed to a function block 1170. Otherwise, control is passed to a function block 1175.

The function block 1170 sets base_mode_weight_flag equal to 1, writes the same to the enhancement layer bitstream, and passes control to a decision block 1180.

The function block 1175 sets base_mode_weight_flag equal to 0, writes the same to the enhancement layer bitstream, and passes control to the decision block 1180.

The decision block 1180 determines whether or not all macroblocks have been weighted. If so, then control is passed to the decision block 1125. Otherwise, control is returned to the function block 1145.

The function block 1185 uses the enhancement layer weights, and passes control to the decision block 1125.

Figure 12:
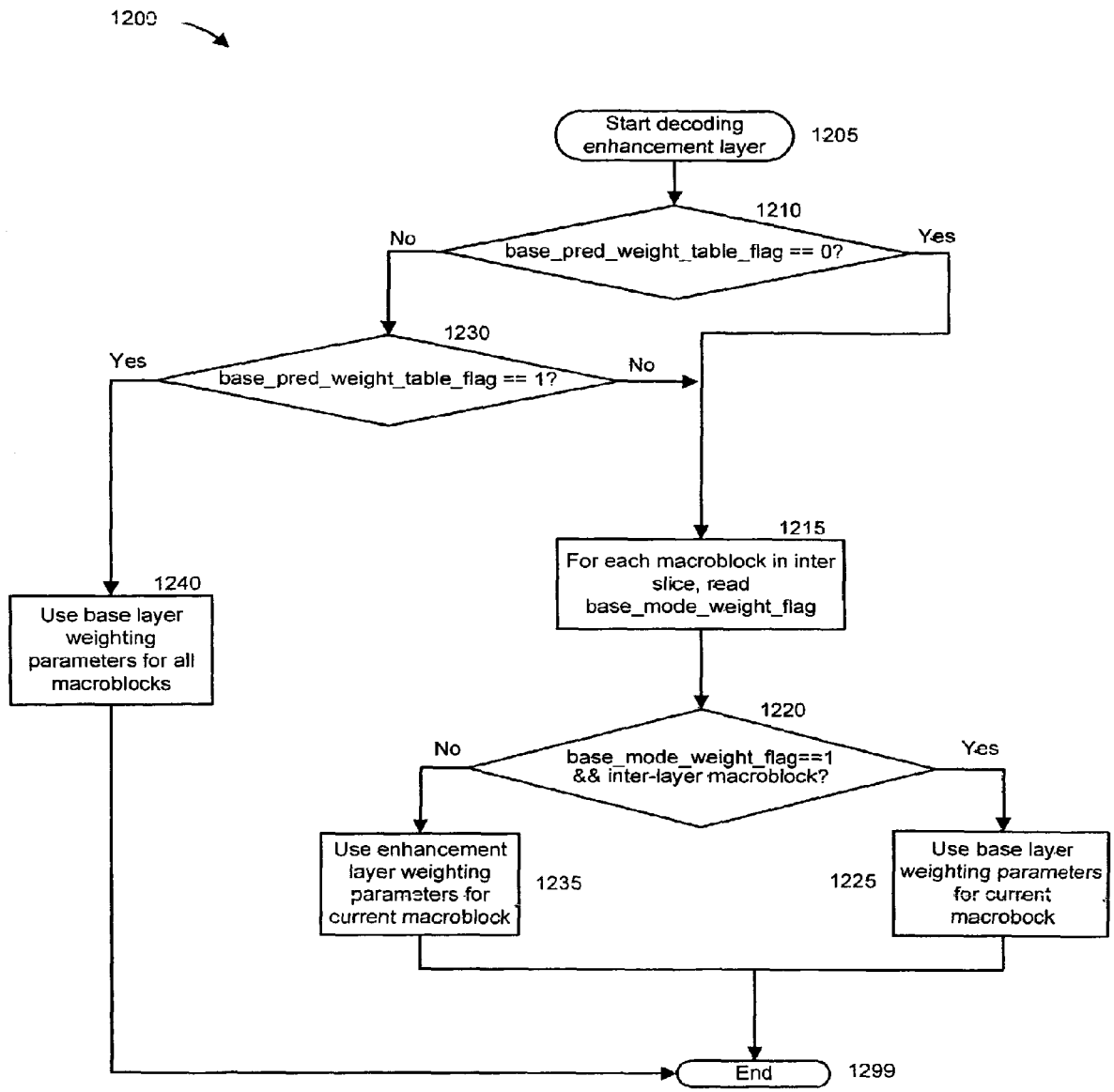
FIG. 12 shows a flow diagram for a method for decoding an enhancement layer in accordance with the exemplary fifth embodiment of the present principles.

Turning to FIG. 12, a method for decoding an enhancement layer using weighted prediction is indicated generally by the reference numeral 1200. The method includes a start block 1205 that starts decoding the enhancement layer, and passes control to a decision block 1210. The decision block 1210 determines whether or not base_pred_weight_table_flag is equal to 0. If so, then control is passed to a function block 1215. Otherwise, control is passed to a decision block 1230.

The function block 1215 reads base_mode_weight_flag for each macroblock in an inter-slice, and passes control to a decision block 1220. The decision block 1220 determines whether or not base_mode_weight_flag is equal to 1 and whether or not the current macroblock is an inter-layer macroblock. If so, then control is passed to a function block 1225. Otherwise, control is passed to a function block 1235.

The function block 1225 uses base layer weighting parameters for the current macroblock, and passes control to an end block 1299.

The function block 1235 uses enhancement layer weighting parameters for the current macroblock, and passes control to the end block 1299

The decision block 1230 determines whether or not base_pred_weight_table_flag is equal to 1. If so, then control is passed to a function block 1240. Otherwise, control is passed to the function block 1215.

The function block 1240 uses the base layer weighting parameters for all macroblocks, and passes control to the end block 1299.

A description will now be given of some of the many attendant advantages/features of the present invention, some of which have been mentioned above. For example, one advantage/feature is a scalable video encoder that includes an encoder for encoding a block in an enhancement layer of a picture by applying a weighting parameter to an enhancement layer reference picture. The weighting parameter used to encode the block in the enhancement layer is adaptively selected from between a weighting parameter applied to a lower layer reference picture to encode a block in the lower layer of the picture and a different weighting parameter applicable in the enhancement layer. The block in the enhancement layer corresponds to the block in the lower layer. The enhancement layer reference picture corresponds to the lower layer reference picture.

Another advantage/feature is the scalable video encoder as described above, wherein the encoder adds a rephrased base_pred_weight_table_flag syntax element in a corresponding header element. The rephrased base_pred_weight_table_flag syntax element is capable of assuming one of two different values. A first one of the two different values is for indicating that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

Moreover, another advantage/feature is the scalable video encoder as described above, wherein the encoder adds a rephrased base_pred_weight_table_flag syntax element in a corresponding header element. The rephrased base_pred_weight_table_flag syntax element is capable of assuming one of two different values. A first one of the two different values is for indicating that blocks in the enhancement layer, irrespective of having a status as inter-layer predicted or non-interlayer predicted, are encoded using different weighting parameters than that used to respectively encode corresponding blocks in the lower layer.

Further, another advantage/feature is the scalable video encoder as described above, wherein the encoder adds a base_mode_weight_flag macroblock level syntax element in a corresponding header element when a base_pred_weight_table_flag syntax element is equal to a first value. The base_mode_weight_flag macroblock level syntax element is for indicating a selection between a first set and a second set of weighting parameters with respect to encoding inter-layer predicted macroblocks in the enhancement layer. The first set includes weighting parameters also respectively used to encode corresponding macroblocks in the lower layer. The second set includes different weight parameters than that respectively used to encode the corresponding macroblocks in the lower layer.

Also, another advantage/feature is the scalable video encoder as described above, wherein the encoder adds a rephrased base_pred_weight_table_flag syntax element in a corresponding header element. The rephrased base_pred_weight_table_flag syntax element is capable of assuming one of three different values.

Additionally, another advantage/feature is the scalable video encoder having the encoder that adds the rephrased base_pred_weight_table_flag syntax element, capable of assuming one of three different values, in the corresponding header element as described above, wherein the encoder sets the rephrased base_pred_weight_table_flag syntax element equal to a particular one of the three different values to indicate that different weighting parameters will be used to encode all macroblocks in the enhancement layer than that respectively used to encode corresponding macroblocks in the lower layer.

Moreover, another advantage/feature is the scalable video encoder having the encoder that adds the rephrased base_pred_weight_table_flag syntax element, capable of assuming one of three different values, in the corresponding header element as described above, wherein the encoder sets the rephrased base_pred_weight_table_flag syntax element equal to a particular one of the three different values to indicate, for all macroblocks in the enhancement layer, that a weighting parameter applied to a particular reference picture in the lower layer to encode a given macroblock in the lower layer will always be also applied to the particular reference picture to encode a corresponding one of the macroblocks in the enhancement layer.

Further, another advantage/feature is the scalable video encoder having the encoder that adds the rephrased base_pred_weight_table_flag syntax element, capable of assuming one of three different values, in the corresponding header element as described above, wherein the encoder sets the rephrased base_pred_weight_table_flag syntax element equal to a particular one of the three different values to indicate that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

Also, another advantage/feature is the scalable video encoder having the encoder that adds the rephrased base_pred_weight_table_flag syntax element, capable of assuming one of three different values, in the corresponding header element as described above, wherein the encoder adds a base_mode_weight_flag macroblock level syntax element in a corresponding header element when the rephrased base_pred_weight_table_flag syntax element is equal to one of two pre-specified values from among the three different values. The base_mode_weight_flag macroblock level syntax element is for indicating a selection between a first set and a second set of weighting parameters with respect to encoding inter-layer predicted macroblocks in the enhancement layer of the picture. The first set includes weighting parameters also respectively used to encode corresponding macroblocks in the lower layer. The second set includes different weight parameters than that respectively used to encode the corresponding macroblocks in the lower layer.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
an encoder for encoding a block in an enhancement layer of a picture by applying a weighting parameter to an enhancement layer reference picture,
wherein the weighting parameter used to encode the block in the enhancement layer is adaptively selected from between a weighting parameter applied to a lower layer reference picture to encode a block in the lower layer of the picture and a different weighting parameter applicable in the enhancement layer, the block in the enhancement layer corresponding to the block in the lower layer, and the enhancement layer reference picture corresponding to the lower layer reference picture.

2. The apparatus of claim 1, wherein said encoder adds a rephrased base_pred_weight_table_flag syntax element in a corresponding header element, the rephrased base_pred_weight_table_flag syntax element capable of assuming one of two different values, a first one of the two different values for indicating that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

3. The apparatus of claim 1, wherein said encoder adds a rephrased base_pred_weight_table_flag syntax element in a corresponding header element, the rephrased base_pred_weight_table_flag syntax element capable of assuming one of two different values, a first one of the two different values for indicating that blocks in the enhancement layer, irrespective of having a status as inter-layer predicted or non-interlayer predicted, are encoded using different weighting parameters than that used to respectively encode corresponding blocks in the lower layer, a second one of the two different values for indicating that the blocks in the enhancement layer, irrespective of having the status as inter-layer predicted or non-interlayer predicted, are encoded using same weighting parameters as that used to respectively encode the corresponding blocks in the lower layer.

4. The apparatus of claim 1, wherein said encoder adds a base_mode_weight_flag macroblock level syntax element in a corresponding header element when a base_pred_weight_table_flag syntax element is equal to a first value, the base_mode_weight_flag macroblock level syntax element for indicating a selection between a first set and a second set of weighting parameters with respect to encoding inter-layer predicted macroblocks in the enhancement layer, the first set including weighting parameters also respectively used to encode corresponding macroblocks in the lower layer, the second set including different weight parameters than that respectively used to encode the corresponding macroblocks in the lower layer.

5. The apparatus of claim 1, wherein said encoder adds a rephrased base_pred_weight_table_flag syntax element in a corresponding header element, the rephrased base_pred_weight_table_flag syntax element capable of assuming one of three different values.

6. The apparatus of claim 5, wherein said encoder sets the rephrased base_pred_weight_table_flag syntax element equal to a particular one of the three different values to indicate that different weighting parameters will be used to encode all macroblocks in the enhancement layer than that respectively used to encode corresponding macroblocks in the lower layer.

7. The apparatus of claim 5, wherein said encoder sets the rephrased base_pred_weight_table_flag syntax element equal to a particular one of the three different values to indicate, for all macroblocks in the enhancement layer, that a weighting parameter applied to a particular reference picture in the lower layer to encode a given macroblock in the lower layer will always be also applied to the particular reference picture to encode a corresponding one of the macroblocks in the enhancement layer.

8. The apparatus of claim 5, wherein said encoder sets the rephrased base_pred_weight_table_flag syntax element equal to a particular one of the three different values to indicate that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

9. The apparatus of claim 5, wherein said encoder adds a base_mode_weight_flag macroblock level syntax element in a corresponding header element when the rephrased base_pred_weight_table_flag syntax element is equal to one of two pre-specified values from among the three different values, the base_mode_weight_flag macroblock level syntax element for indicating a selection between a first set and a second set of weighting parameters with respect to encoding inter-layer predicted macroblocks in the enhancement layer of the picture, the first set including weighting parameters also respectively used to encode corresponding macroblocks in the lower layer, the second set including different weight parameters than that respectively used to encode the corresponding macroblocks in the lower layer.

10. In a video encoder, a method for scalable video encoding, comprising:
encoding a block in an enhancement layer of a picture by applying a weighting parameter to an enhancement layer reference picture,
wherein the weighting parameter used to encode the block in the enhancement layer is adaptively selected from between a weighting parameter applied to a lower layer reference picture to encode a block in the lower layer of the picture and a different weighting parameter applicable in the enhancement layer, the block in the enhancement layer corresponding to the block in the lower layer, and the enhancement layer reference picture corresponding to the lower layer reference picture.

11. The method of claim 10, wherein said encoding step comprises adding a rephrased base_pred_weight_table_flag syntax element in a corresponding header element, the rephrased base_pred_weight_table_flag syntax element capable of assuming one of two different values, a first one of the two different values for indicating that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

12. The method of claim 10, wherein said encoding step comprises adding a rephrased base_pred_weight_table_flag syntax element in a corresponding header element, the rephrased base_pred_weight_table_flag syntax element capable of assuming one of two different values, a first one of the two different values for indicating that blocks in the enhancement layer, irrespective of having a status as inter-layer predicted or non-interlayer predicted, are encoded using different weighting parameters than that used to respectively encode corresponding blocks in the lower layer, a second one of the two different values for indicating that the blocks in the enhancement layer, irrespective of having the status as inter-layer predicted or non-interlayer predicted, are encoded using same weighting parameters as that used to respectively encode the corresponding blocks in the lower layer.

13. The method of claim 10, wherein said encoding step comprises adding a base_mode_weight_flag macroblock level syntax element in a corresponding header element when a base_pred_weight_table_flag syntax element is equal to a first value, the base_mode_weight_flag macroblock level syntax element for indicating a selection between a first set and a second set of weighting parameters with respect to encoding inter-layer predicted macroblocks in the enhancement layer, the first set including weighting parameters also respectively used to encode corresponding macroblocks in the lower layer, the second set including different weight parameters than that respectively used to encode the corresponding macroblocks in the lower layer.

14. The method of claim 10, wherein said encoding step comprises adding a rephrased base_pred_weight_table_flag syntax element in a corresponding header element, the rephrased base_pred_weight_table_flag syntax element capable of assuming one of three different values.

15. The method of claim 14, wherein said encoding step comprises setting the rephrased base_pred_weight_table_flag syntax element equal to a particular one of the three different values to indicate that different weighting parameters will be used to encode all macroblocks in the enhancement layer than that respectively used to encode corresponding macroblocks in the lower layer.

16. The method of claim 14, wherein said encoding step comprises setting the rephrased base_pred_weight_table_flag syntax element equal to a particular one of the three different values to indicate, for all macroblocks in the enhancement layer, that a weighting parameter applied to a particular reference picture in the lower layer to encode a given macroblock in the lower layer will always be also applied to the particular reference picture to encode a corresponding one of the macroblocks in the enhancement layer.

17. The method of claim 14, wherein said encoding step comprises setting the rephrased base_pred_weight_table_flag syntax element equal to a particular one of the three different values to indicate that inter-layer predicted blocks in the enhancement layer are encoded using weighting parameters that are also respectively used in the lower layer to encode blocks corresponding to the inter-layer predicted blocks, and that non-inter-layer predicted blocks in the enhancement layer are encoded using different weighting parameters than that respectively used in the lower layer to encode blocks corresponding to the non-inter-layer predicted blocks.

18. The method of claim 14, wherein said encoding step comprises adding a base_mode_weight_flag macroblock level syntax element in a corresponding header element when the rephrased base_pred_weight_table_flag syntax element is equal to one of two pre-specified values from among the three different values, the base_mode_weight_flag macroblock level syntax element for indicating a selection between a first set and a second set of weighting parameters with respect to encoding inter-layer predicted macroblocks in the enhancement layer of the picture, the first set including weighting parameters also respectively used to encode corresponding macroblocks in the lower layer, the second set including different weight parameters than that respectively used to encode the corresponding macroblocks in the lower layer.

19. An apparatus comprising:
a decoder for decoding a block in an enhancement layer of a picture by applying a weighting parameter to an enhancement layer reference picture,
wherein the weighting parameter used to decode the block in the enhancement layer is adaptively determined from between a weighting parameter applied to a lower layer reference picture to decode a block in the lower layer of the picture and a different weighting parameter applicable in the enhancement layer, the block in the enhancement layer corresponding to the block in the lower layer, and the enhancement layer reference picture corresponding to the lower layer reference picture.

20. The apparatus of claim 19, wherein said decoder reads a rephrased base_pred_weight_table_flag syntax element in a corresponding header element, the rephrased base_pred_weight_table_flag syntax element capable of assuming one of two different values, a first one of the two different values for indicating that inter-layer predicted blocks in the enhancement layer are decoded using weighting parameters that are also respectively used in the lower layer to decode blocks corresponding to the inter-layer predicted blocks, and that non-inter-layer predicted blocks in the enhancement layer are decoded using different weighting parameters than that respectively used in the lower layer to decode blocks corresponding to the non-inter-layer predicted blocks.

21. The apparatus of claim 19, wherein said decoder reads a rephrased base_pred_weight_table_flag syntax element in a corresponding header element, the rephrased base_pred_weight_table_flag syntax element capable of assuming one of two different values, a first one of the two different values for indicating that blocks in the enhancement layer, irrespective of having a status as inter-layer predicted or non-interlayer predicted, are decoded using different weighting parameters than that used to respectively decode corresponding blocks in the lower layer, a second one of the two different values for indicating that the blocks in the enhancement layer, irrespective of having the status as inter-layer predicted or non-interlayer predicted, are decoded using same weighting parameters as that used to respectively decode the corresponding blocks in the lower layer.

22. The apparatus of claim 19, wherein said decoder reads a base_mode_weight_flag macroblock level syntax element in a corresponding header element when a base_pred_weight_table_flag syntax element is equal to a first value, the base_mode_weight_flag macroblock level syntax element for use in determining between a first set and a second set of weighting parameters with respect to decoding inter-layer predicted macroblocks in the enhancement layer, the first set including weighting parameters also respectively used to decode corresponding macroblocks in the lower layer, the second set including different weight parameters than that respectively used to decode the corresponding macroblocks in the lower layer.

23. The apparatus of claim 19, wherein said decoder reads a rephrased base_pred_weight_table_flag syntax element in a corresponding header element, the rephrased base_pred_weight_table_flag syntax element capable of assuming one of three different values.

24. The apparatus of claim 23, wherein said decoder reads the rephrased base_pred_weight_table_flag syntax element set equal to a particular one of the three different values to indicate that different weighting parameters will be used to decode all macroblocks in the enhancement layer than that respectively used to decode corresponding macroblocks in the lower layer.

25. The apparatus of claim 23, wherein said decoder reads the rephrased base_pred_weight_table_flag syntax element set equal to a particular one of the three different values to indicate, for all macroblocks in the enhancement layer, that a weighting parameter applied to a particular reference picture in the lower layer to decode a given macroblock in the lower layer will always be also applied to the particular reference picture to decode a corresponding one of the macroblocks in the enhancement layer.

26. The apparatus of claim 23, wherein said decoder reads the rephrased base_pred_weight_table_flag syntax element set equal to a particular one of the three different values to indicate that inter-layer predicted blocks in the enhancement layer are decoded using weighting parameters that are also respectively used in the lower layer to decode blocks corresponding to the inter-layer predicted blocks, and that non-inter-layer predicted blocks in the enhancement layer are decoded using different weighting parameters than that respectively used in the lower layer to decode blocks corresponding to the non-inter-layer predicted blocks.

27. The apparatus of claim 23, wherein said decoder reads a base_mode_weight_flag macroblock level syntax element in a corresponding header element when the rephrased base_pred_weight_table_flag syntax element is equal to one of two pre-specified values from among the three different values, the base_mode_weight_flag macroblock level syntax element for use in determining between a first set and a second set of weighting parameters with respect to decoding inter-layer predicted macroblocks in the enhancement layer of the picture, the first set including weighting parameters also respectively used to decode corresponding macroblocks in the lower layer, the second set including different weight parameters than that respectively used to decode the corresponding macroblocks in the lower layer.

28. In a video decoder, a method for scalable video decoding, comprising:
decoding a block in an enhancement layer of a picture by applying a weighting parameter to an enhancement layer reference picture,
wherein the weighting parameter used to decode the block in the enhancement layer is adaptively determined from between a weighting parameter applied to a lower layer reference picture to decode a block in the lower layer of the picture and a different weighting parameter applicable in the enhancement layer, the block in the enhancement layer corresponding to the block in the lower layer, and the enhancement layer reference picture corresponding to the lower layer reference picture.

29. The method of claim 28, wherein said decoding step comprises reading a rephrased base_pred_weight_table_flag syntax element in a corresponding header element, the rephrased base_pred_weight_table_flag syntax element capable of assuming one of two different values, a first one of the two different values for indicating that inter-layer predicted blocks in the enhancement layer are decoded using weighting parameters that are also respectively used in the lower layer to decode blocks corresponding to the inter-layer predicted blocks, and that non-inter-layer predicted blocks in the enhancement layer are decoded using different weighting parameters than that respectively used in the lower layer to decode blocks corresponding to the non-inter-layer predicted blocks.

30. The method of claim 28, wherein said decoding step comprises reading a rephrased base_pred_weight_table_flag syntax element in a corresponding header element, the rephrased base_pred_weight_table_flag syntax element capable of assuming one of two different values, a first one of the two different values for indicating that blocks in the enhancement layer, irrespective of having a status as inter-layer predicted or non-interlayer predicted, are decoded using different weighting parameters than that used to respectively decode corresponding blocks in the lower layer, a second one of the two different values for indicating that the blocks in the enhancement layer, irrespective of having the status as inter-layer predicted or non-interlayer predicted, are decoded using same weighting parameters as that used to respectively decode the corresponding blocks in the lower layer.

31. The method of claim 28, wherein said decoding step comprises reading a base_mode_weight_flag macroblock level syntax element in a corresponding header element when a base_pred_weight_table_flag syntax element is equal to a first value, the base_mode_weight_flag macroblock level syntax element for use in determining between a first set and a second set of weighting parameters with respect to decoding inter-layer predicted macroblocks in the enhancement layer, the first set including weighting parameters also respectively used to decode corresponding macroblocks in the lower layer, the second set including different weight parameters than that respectively used to decode the corresponding macroblocks in the lower layer.

32. The method of claim 28, wherein said decoding step comprises reading a rephrased base_pred_weight_table_flag syntax element in a corresponding header element, the rephrased base_pred_weight_table_flag syntax element capable of assuming one of three different values.

33. The method of claim 32, wherein said decoding step comprises reading the rephrased base_pred_weight_table_flag syntax element set equal to a particular one of the three different values to indicate that different weighting parameters will be used to decode all macroblocks in the enhancement layer than that respectively used to decode corresponding macroblocks in the lower layer.

34. The method of claim 32, wherein said decoding step comprises reading the rephrased base_pred_weight_table_flag syntax element set equal to a particular one of the three different values to indicate, for all macroblocks in the enhancement layer, that a weighting parameter applied to a particular reference picture in the lower layer to decode a given macroblock in the lower layer will always be also applied to the particular reference picture to decode a corresponding one of the macroblocks in the enhancement layer.

35. The method of claim 32, wherein said decoding step comprises reading the rephrased base_pred_weight_table_flag syntax element set equal to a particular one of the three different values to indicate that inter-layer predicted blocks in the enhancement layer are decoded using weighting parameters that are also respectively used in the lower layer to decode blocks corresponding to the inter-layer predicted blocks, and that non-inter-layer predicted blocks in the enhancement layer are decoded using different weighting parameters than that respectively used in the lower layer to decode blocks corresponding to the non-inter-layer predicted blocks.

36. The method of claim 32, wherein said decoding step comprises reading a base_mode_weight_flag macroblock level syntax element in a corresponding header element when the rephrased base_pred_weight_table_flag syntax element is equal to one of two pre-specified values from among the three different values, the base_mode_weight_flag macroblock level syntax element for use in determining between a first set and a second set of weighting parameters with respect to decoding inter-layer predicted macroblocks in the enhancement layer of the picture, the first set including weighting parameters also respectively used to decode corresponding macroblocks in the lower layer, the second set including different weight parameters than that respectively used to decode the corresponding macroblocks in the lower layer.

37. A non-transitory storage media having scalable video signal data encoded thereupon, comprising:
a block encoded in an enhancement layer of a picture generated by applying a weighting parameter to an enhancement layer reference picture,
wherein the weighting parameter used to encode the block in the enhancement layer is adaptively selected from between a weighting parameter applied to a lower layer reference picture to encode a block in the lower layer of the picture and a different weighting parameter applicable in the enhancement layer, the block in the enhancement layer corresponding to the block in the lower layer, and the enhancement layer reference picture corresponding to the lower layer reference picture.

* * * * *